United States Patent Office 3,440,866
Patented Apr. 29, 1969

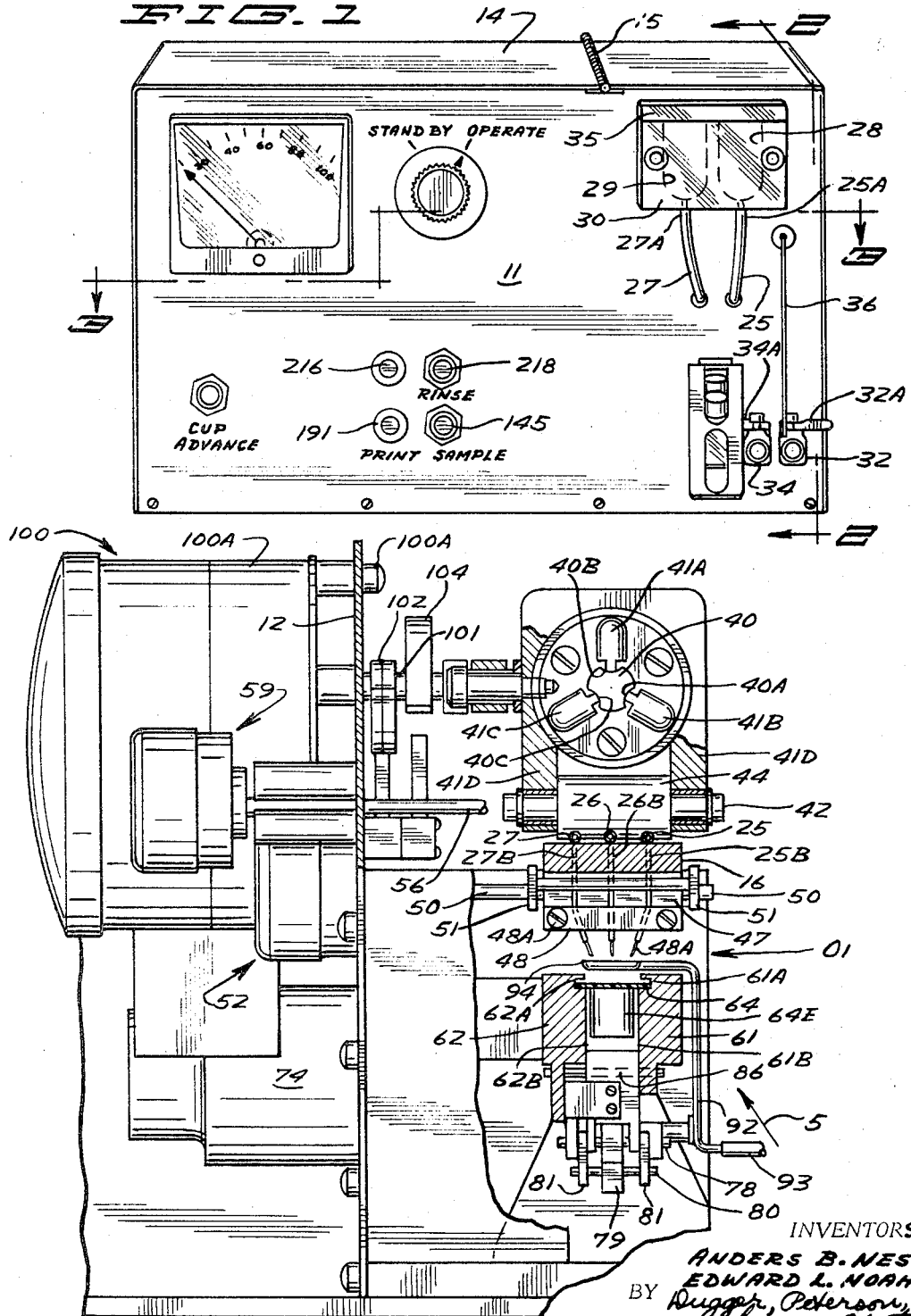

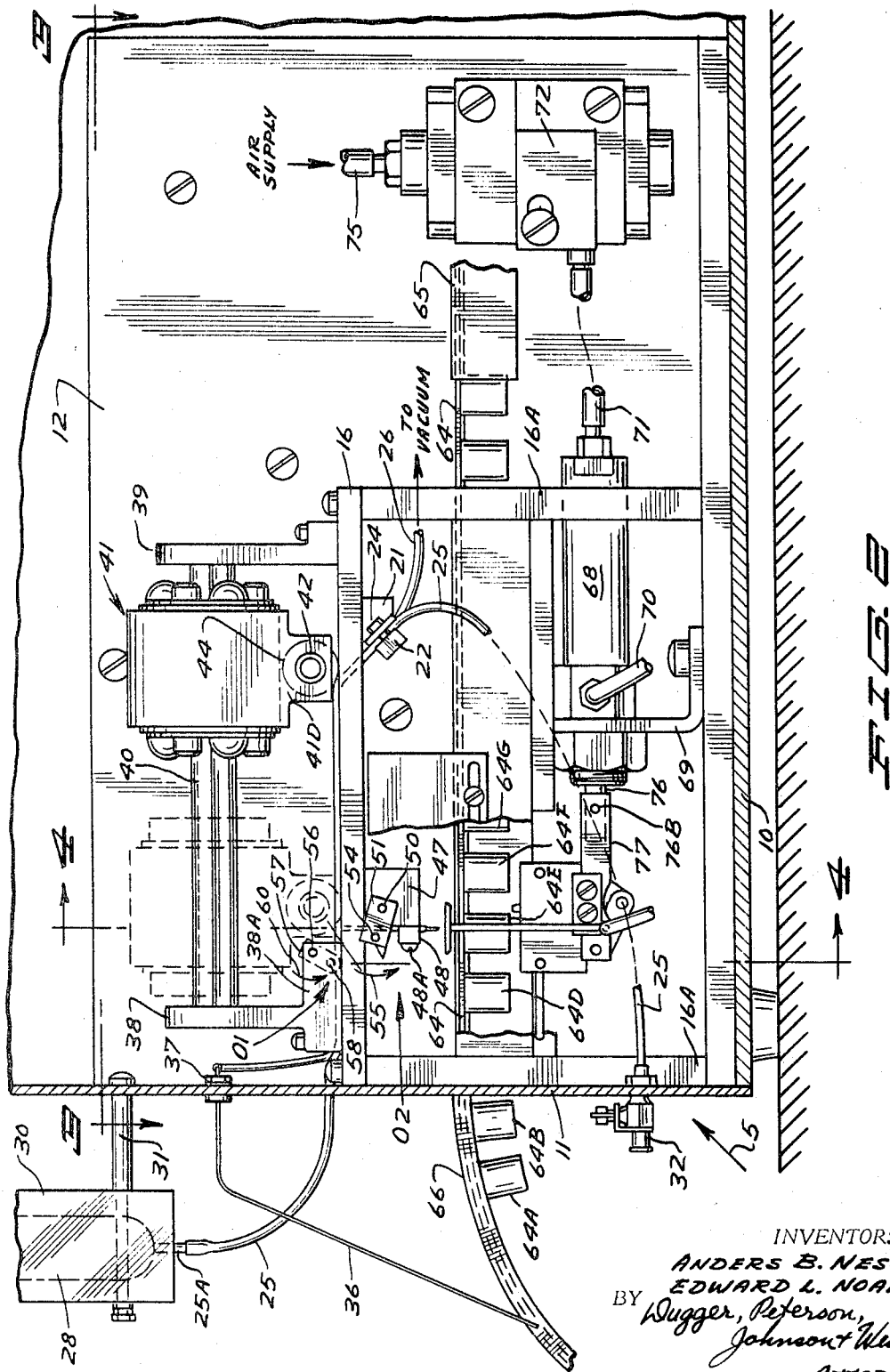

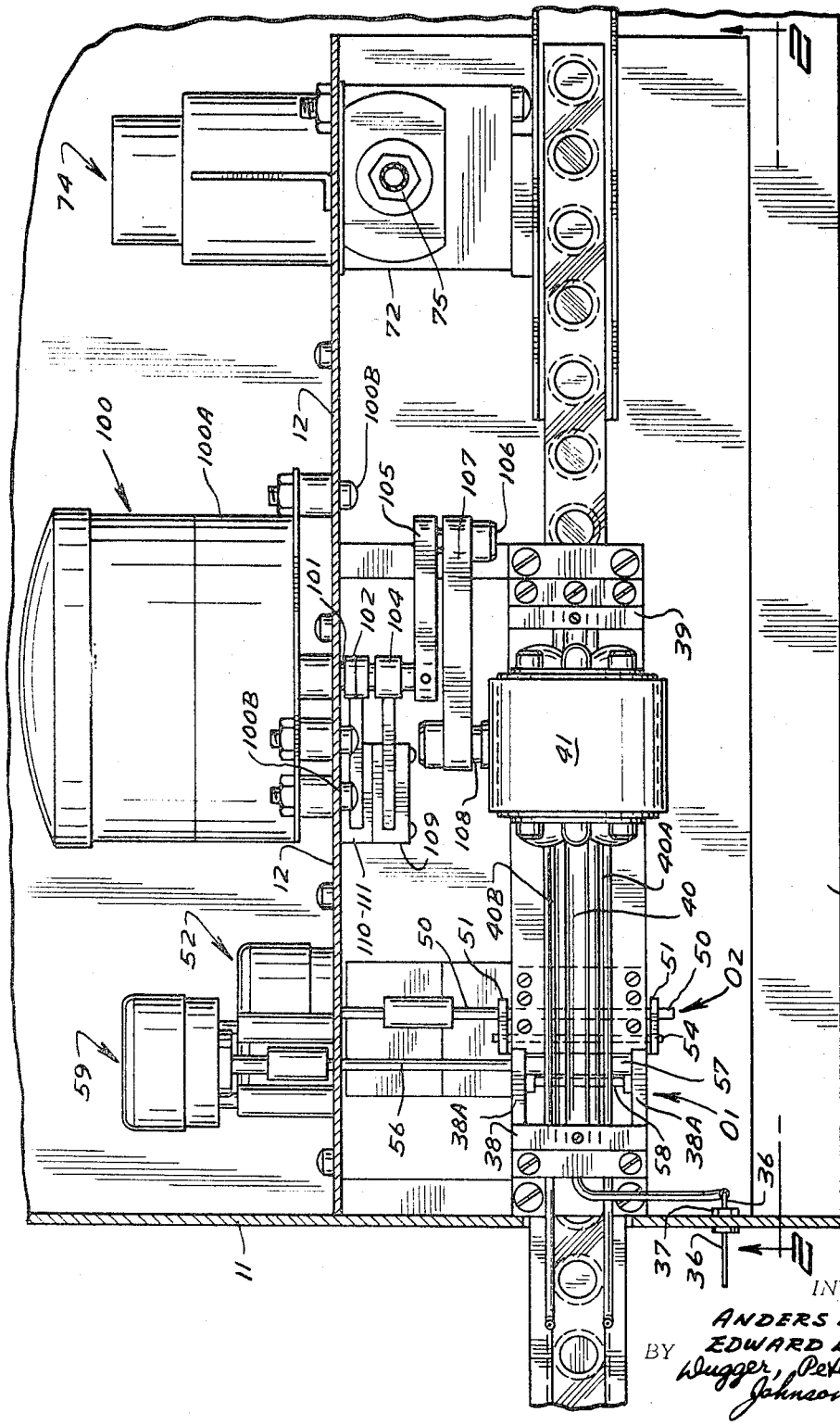

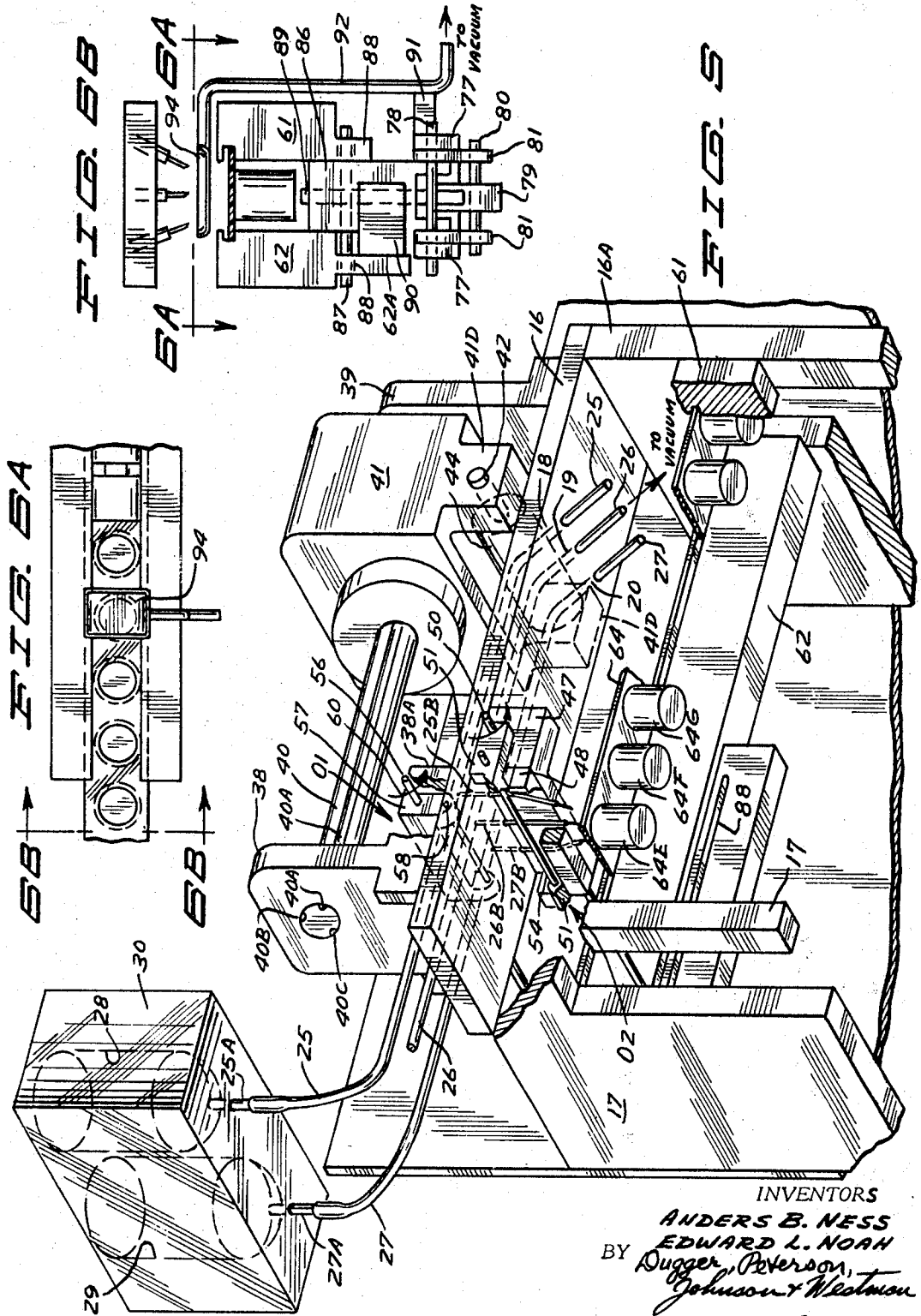

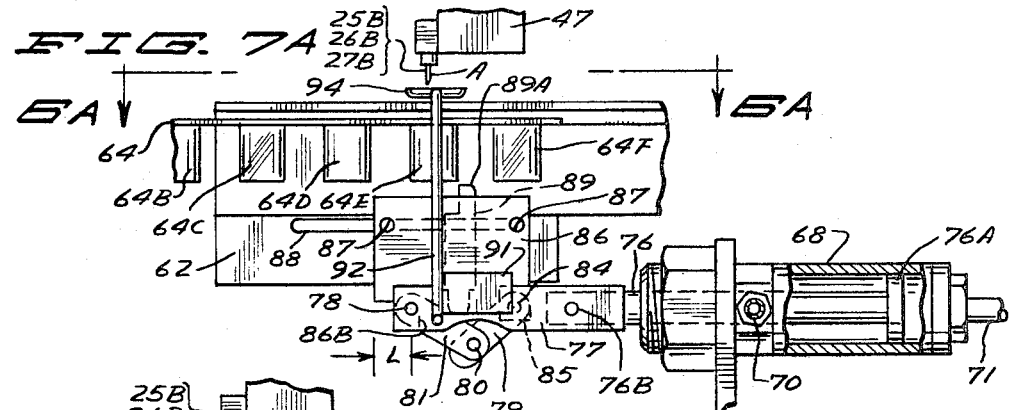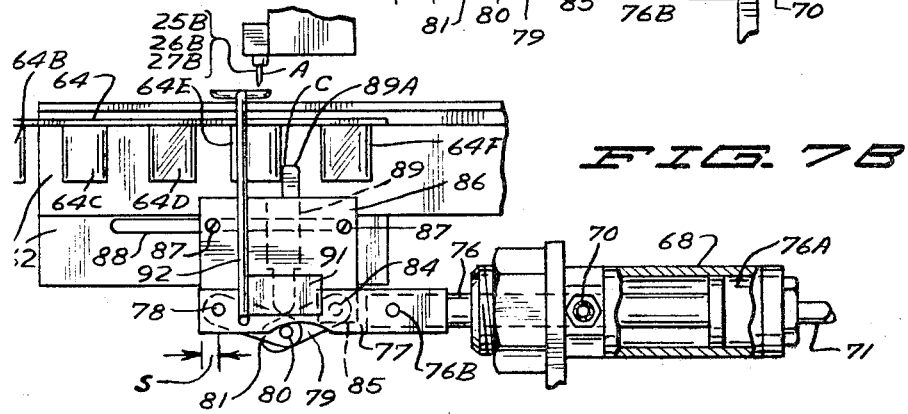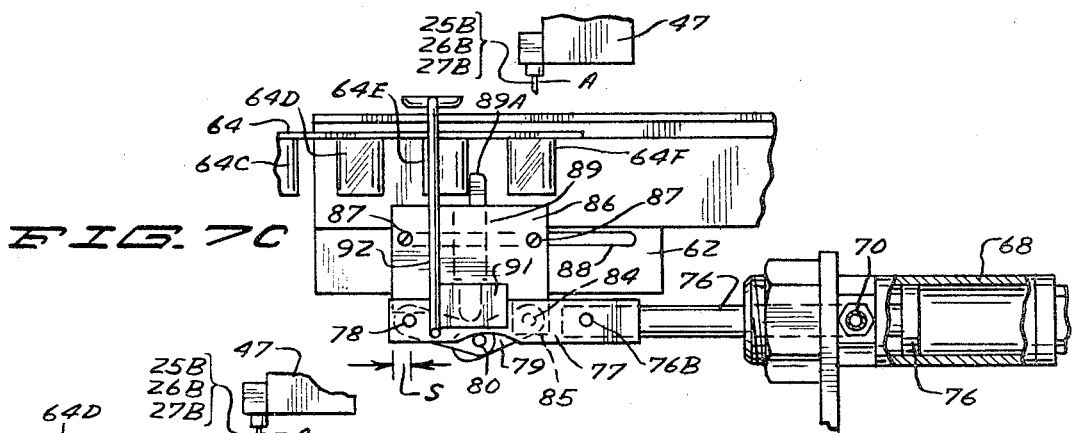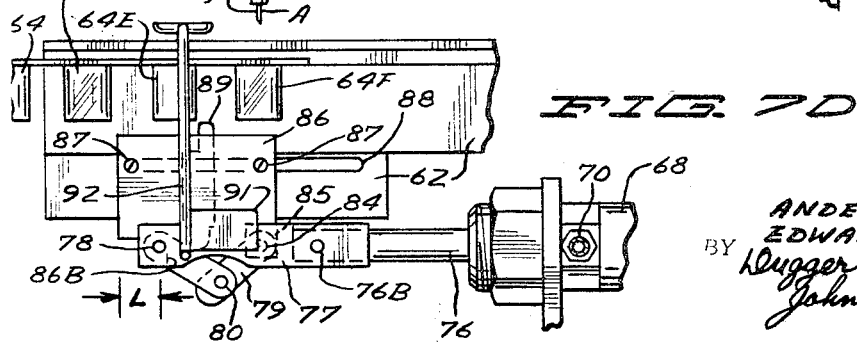

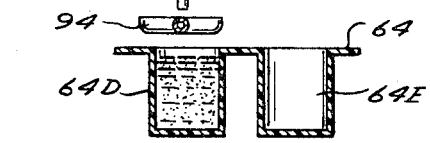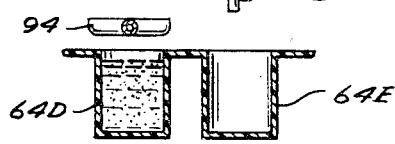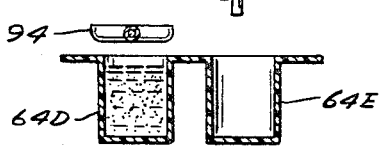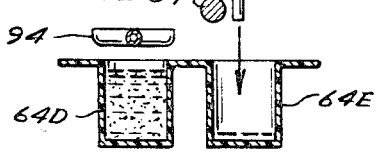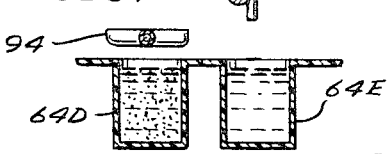

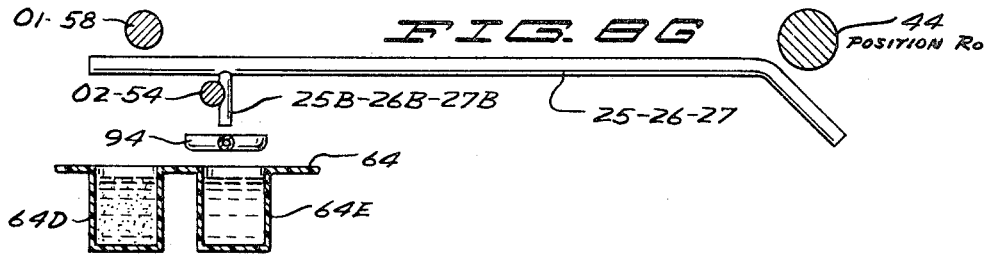
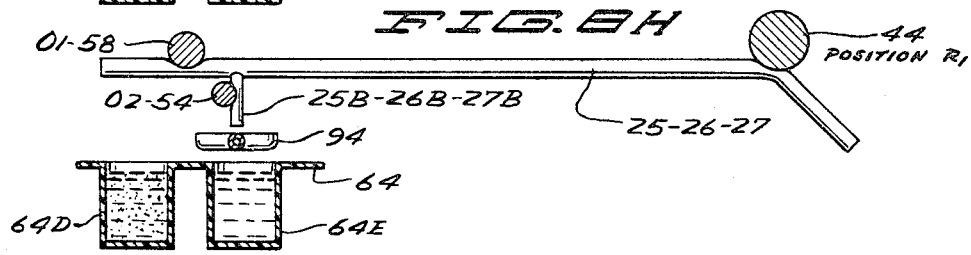
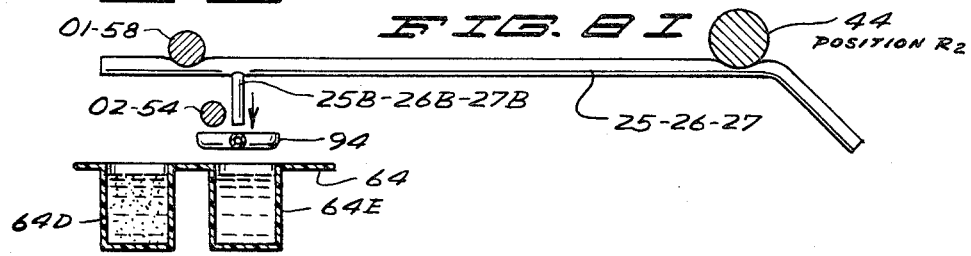
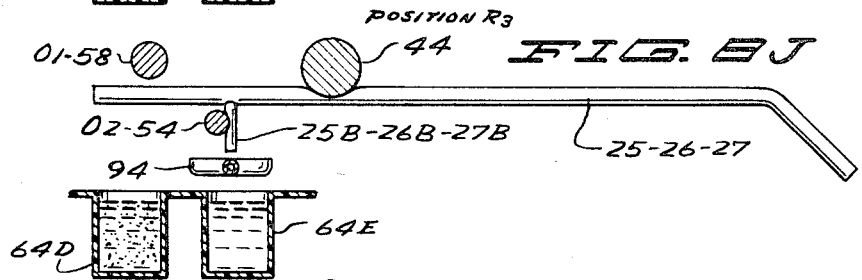
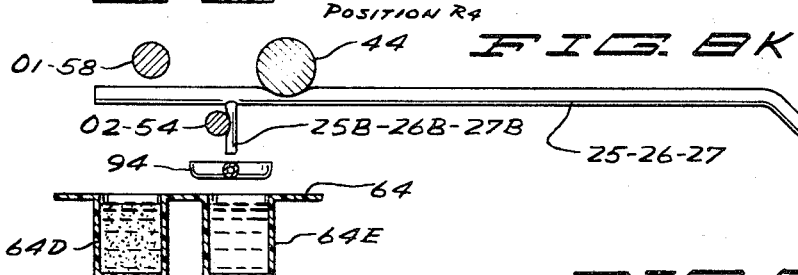
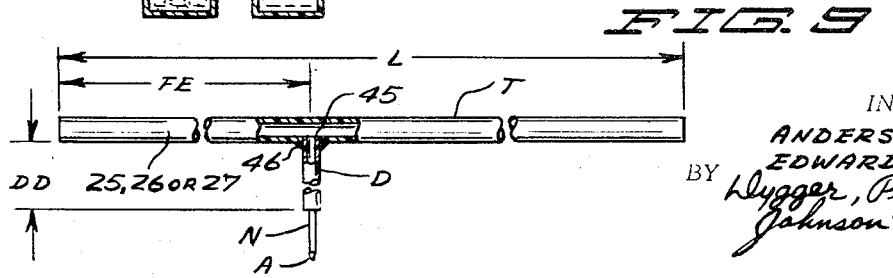

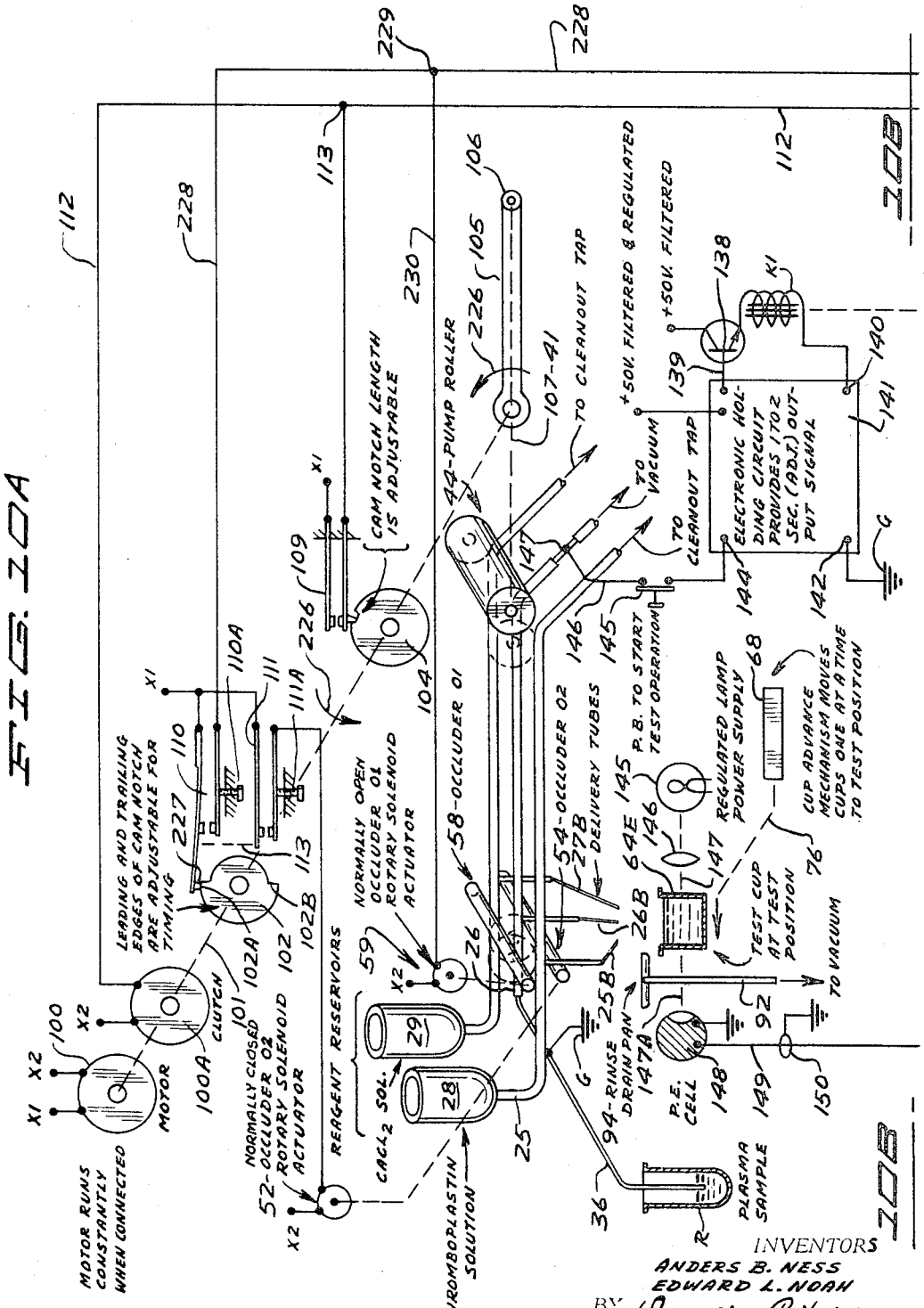

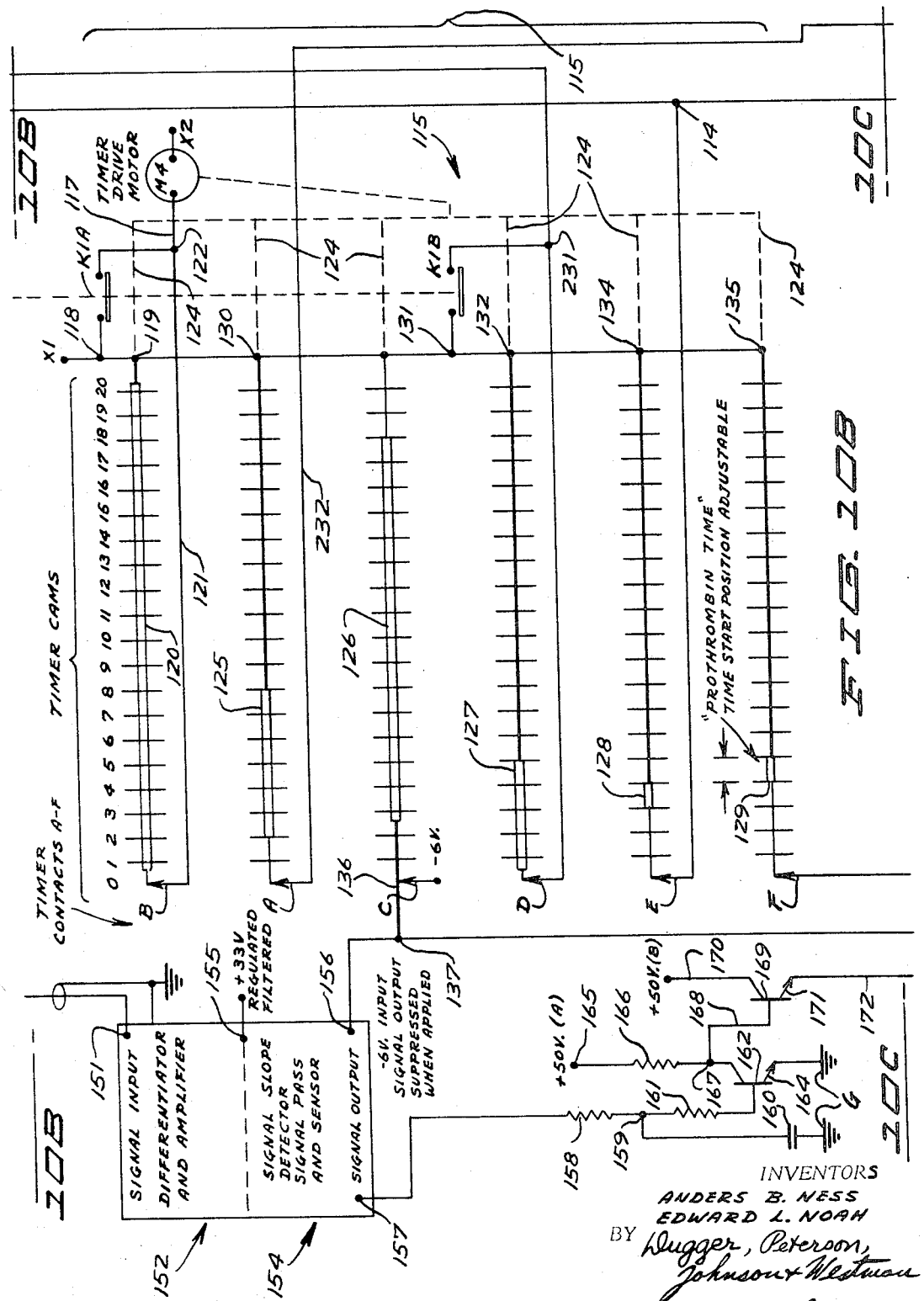

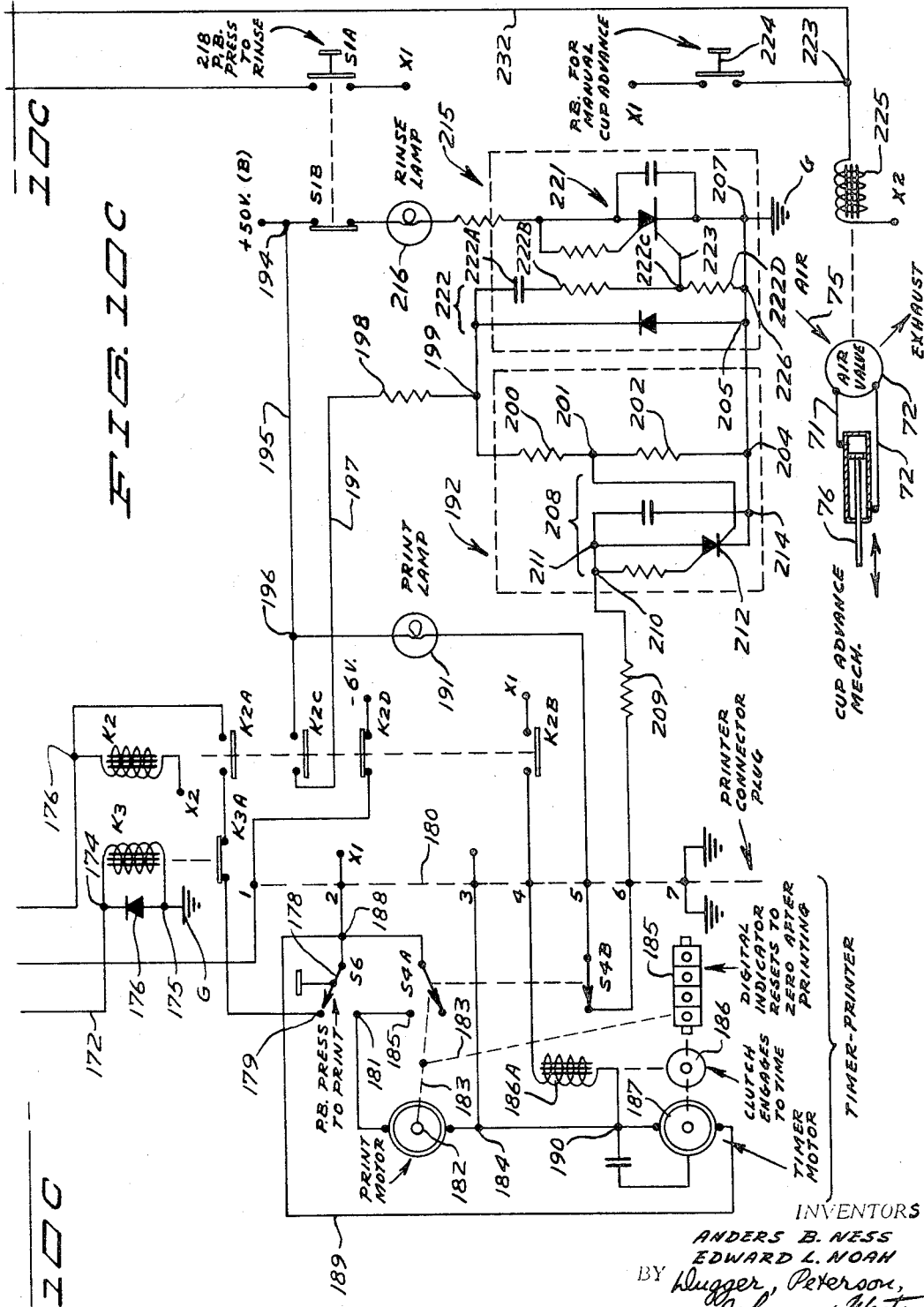

3,440,866
PROTHROMBIN TIMER APPARATUS AND METHOD
Anders B. Ness, Kasson, and Edward L. Noah, Rochester, Minn., assignors to Research Corporation, New York, N.Y., a corporation of New York
Filed Sept. 1, 1966, Ser. No. 577,574
Int. Cl. G01n 11/00
U.S. Cl. 73—64.1                                    29 Claims

ABSTRACT OF THE DISCLOSURE

Machine and method for measuring prothrombin time. Under operator control batches of plasma and clotting reactant are delivered through separate conduits directly into test cups successively advanced by machine. Light measurements are made on reactants in each test cup to determine prothrombin time. Provision is made for arbitrarily adjusting prothrombin time measurements, as made by the invention for correlating such measurements with those made by known testing procedures. The machine automatically covers test cup after receiving test ingredients; during testing receives and delivers elsewhere rinsing solutions by which machine is cleaned preparatory to next test; provides operator controls and related signals for initiating test, rinsing and cup advance; locks out delicate circuitry during intra-testing when conditions produce large transient signals; digital readout of test result is provided.

---

This invention relates to improved apparatus and method for determining what is known in medical arts as "prothrombin time." The "prothrombin time" test was originally designed to measure the concentration of prothrombin in plasma, and was important because of the nearly concurrent discovery of vitamin K and of the hypothrombinemia resulting from a deficiency of vitamin K. Upon the discovery of dicumarol, and other drugs of the type of coumarin and indanedione, the "prothrombin time" test has become even more important. Despite the fact that the "prothrombin time" test is now known to measure other factors than prothrombin, this test is still a standard procedure throughout the world for controlling patients receiving coumarin and indanedione compounds. These drugs are administered for three reasons: (1) immediately after an operation to prevent the occurrence of thromboses; (2) whenever thromboembotic states do occur, and (3) on a long term basis to patients with unusual tendencies toward thromboses—notably patients with coronary heart disease.

The "prothrombin time" test is a measure of the clotting time of plasma to which a tissue thromboplastin suspension (brain or lung extract) has been added. The test, as carried out manually, is as follows: To one-half milliliter of M/10 sodium oxalate there is added 4.5 milliliters of freshly drawn venous blood. The plasma is separated from the cells by brief centrifugation. One-tenth milliliter of the oxalated plasma is mixed with 0.1 milliliter of thromboplastin suspension and then with 0.1 milliliter of M/40–M/50 calcium chloride (to overcome the oxalate added originally). The "clot time" is determined with the mixture maintained at 37.5° C. Depending upon the source and method of preparation of the thromboplastin suspension, normal plasma clots in 16 to 19 seconds, but may not occur until a longer time period has elapsed, i.e. 30–50 seconds, and in extreme instances until as much as 80–90 seconds has elapsed. The test is reported as "clot time in seconds" or as a "percent of normal" the latter being based on a series of assumptions which are difficult to evaluate and are considered unreliable by some investigators.

According to the invention of Charles A. Owen and James Isaacson as disclosed in their application Ser. No. 364,564, filed May 4, 1964, now Patent No. 3,307,392, it was discovered that the clotting time of plasma also yields a simultaneous change in its optical transmission. The initial change in such optical transmission was found to be expressed by an exponential curve of which the initial portion is concave upward; then passing through a first point of inflection the curve becomes concave downward, during which there is a marked decrease in optical transmission, providing a reliable index of clotting time. The downwardly concave portion of the curve persists only a short time, and then passes through a second point of inflection after which the curve becomes concave upward and gradually becomes asymptotic to the time axis.

Owen and Isaacson found that in order to utilize the phenomenon of optical transmission of the clotting plasma mixture as an index of clotting time, much enhanced results were had by first obtaining a first derivative of the light transmission signal, and then utilizing such first derivative signal for time measurement. The first derivative function was achieved electrically by capacitively coupling the photocell output to a responsive amplifier, so that only the change in optical transmission through the sample was measured. The resultant first derivative signal could then be read out conveniently by metering or suitable circuitry.

The present invention is based upon and is an improvement of the Owen and Isaacson invention covered by their application Ser. No. 364,564, filed May 4, 1964, now Patent No. 3,307,392.

It is an object of the present invention to provide an improved prothrombin timer apparatus and method wherein the liquid ingredients used in each test are separately measured and dispensed by separate measuring devices and are not commingled prior to testing.

It is another object of the present invention to provide an improved prothrombin timer apparatus wherein each ingredient required for the test is separately procured in requisite amount from its supply and then separately and simultaneously discharged into the testing receptacle.

It is another object of the present invention to provide for supply storage of testing ingredients at safe temperature and under quiescent conditions free from unnecessary agitation during non-testing periods.

It is another object of the present invention to provide a prothrombin testing apparatus and method wherein means is provided for measuring and dispensing the plasma sample and then after dispensing the sample, providing for the rinsing of the measuring and dispensing means, so as to eliminate carry-over and intermingling the residue of one sample with a succeeding sample.

It is another object of the invention to provide an improved prothrombin testing apparatus wherein the testing chamber is covered during testing.

It is another object of the invention to provide an improved prothrombin testing apparatus wherein the test sample and ingredients are introduced into a test chamber and the test is initiated and then automatically conducted.

It is a general object of the invention to provide a proportioning pump for multiple liquid reagents used in reactions.

It is a further object of the invention to provide an improved operator controlled sequential prothrombin timer requiring positive sequential operator action for rinsing between each prothrombin test cycle.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is a perspective front view of an exemplary embodiment of machine of the invention;

FIGURE 2 is a longitudinal fore and aft sectional view taken along the lines and in the direction of arrow 2—2 of FIGURES 1 and 3;

FIGURE 3 is a fragmentary horizontal sectional view taken along the line and in the direction of arrows 3—3 of FIGURE 2;

FIGURE 4 is a vertical sectional view taken along the lines and in the direction of arrows 4—4 of FIGURE 2;

FIGURE 5 is an underside isometric view from the lower right, taken in the approximate direction of arrow 5 of FIGURES 2 and 4, showing portions of the apparatus broken away and some parts removed and some in section;

FIGURES 6A and 6B are enlarged fragmentary views, partly in section, of the cup supporting and cup covering mechanism, FIGURE 6A being taken along the line and in the direction of arrows 6A—6A of FIGURES 6B and 7A, and FIGURE 6B being taken along the line and in the direction of arrows 6B—6B of FIGURES 6A and 7B;

FIGURES 7A, 7B, 7C and 7D are fragmentary enlarged vertical sectional views, with some parts broken away, showing the cup advance mechanism in various positions of movement;

FIGURES 8A through 8K are diagrammatic views in side elevation, illustrating the front one of the proportioning pump tubes (it being representative of all three), the pump roller and the occluders and the test cup and test cup cover. These figures show the parts in various positions which they assume during their sequence of operation, FIGURES 8A through 8F illustrating the "prothrombin time" testing cycle and FIGURES 8G through 8K illustrating the rinsing cycle which is always carried out between such testing cycles;

FIGURE 9 is a side elevational view, partly in section, showing one of the plastic tube and dispensing needle assembly, used in the invention, it being illustrative of all three such assemblies; and FIGURES 10A, 10B and 10C are a wiring diagram of the whole apparatus, with certain of the mechanical elements being shown thereon. These figures should be placed one above the other reading FIGURE 10A, FIGURE 10B and FIGURE 10C from top to bottom.

Throughout the drawings, the same numerals refer to the same parts.

Referring to the drawings, particularly FIGURES 1–7D, the machine, in general, comprises a frame 10 having a front panel 11 and a central supporting panel 12. As will be observed in FIGURE 1, the machine is in the form of a box. The front panel 11, being the front of the box, serves as a mounting for various instruments and controls. The remainder of the box is enclosed by housing 14, conveniently hinged at 15, for removal.

On the right side of central panel 12, as viewed from the front, looking rearward, as in FIGURE 4, there is a heavy plate 16, extending from just inside of the front panel 11, then rearwardly into the machine enclosure as shown in FIGURE 3. The plate 16 is mounted on legs 16A. Plate 16 is a thick piece of metal of good heat conducting properties, such as aluminum, and has embedded therein an electrical heating apparatus having suitable thermostatic controls for maintaining the temperature of the plate 16 at a desired substantially constant temperature, such as 35–37.5° C. The temperature is closely controlled, and the enclosing housing 14 helps maintain a uniform atmospheric temperature in and around the plate 16. The heater and controls are not illustrated. As shown in FIGURE 5, the plate 16 has three apertures at 18, 19 and 20 directed downwardly, near the rear of the plate (see FIGURE 5) and immediately behind these apertures, and on the underside of the plate there is a fastening block 21, to which a clamp bar 22 is removably attached by screws 24, see FIGURES 2 and 4. The three apertures 18, 19 and 20 permit the downward insertion therethrough of the rear ends of three plastic tubes 25, 26 and 27 constructed as illustrated in FIGURE 9. Except for length these tubes are identical. Bar 22 locates and gently holds the tubes 25, 26 and 27 but does not clamp them shut. This form of fastening is intended only to prevent the tubes from creeping endwise.

The tubes 25, 26 and 27 are made of a resilient plastic material suitable for medical uses, for example silicon rubber materials, such as Silastic (trademark) tubing. While the diameter of the tubing may be varied, it is mentioned, without limitation, that in the particular embodiment of the invention here illustrated, the tubing has an outside diameter of 0.095″ and an inside diameter of 0.062″. All of the tubes 25, 26 and 27 are similar. They extend up through their respective apertures 18, 19 and 20 and thence along the flat upper surface of the plate 16, toward the front of the machine. The two outer tubes 25 and 27 are for measuring and dispensing the reagents used in the "prothrombin time" reaction, namely thromboplastin suspension (tube 25) and calcium chloride solution (tube 27). These tubes extend outwardly through apertures in the front panel 11 of the machine, as shown in FIGURES 1 and 2, and connect respectively to the outlets 25A and 27A of reservoirs 28 and 29 respectively. These reservoirs are simply holes machined in a transparent plastic block 30, that is supported by the studs 31 spaced outwardly from the front panel 11 of the machine. The rear ends of these tubes 25 and 27 are inside the machine and as shown in FIGURE 2 curve downwardly and forwardly and connect respectively to individual petcocks 32 and 34 accessible from the front of panel 11, see FIGURES 1 and 2, each of which is provided with a shutoff handle as at 32A and 34A. The petcocks are provided with a tapered entrance mouth for the convenient insertion thereto for attachment of an external vacuum supply tube so as to permit the flushing out of the reservoirs 28 and 29 and tubes 25 and 27 by drawing through them distilled water or other suitable rinsing materials. To do this it is only necessary to remove the cover 35 of the reservoir, see FIGURE 1, and with the tubes 25 and 27 uninterrupted throughout their length (as will be when the machine is at the end of its cycle) and with vacuum applied at the petcocks 32 and 34, with the valves 32A and 34A open, the material in the reservoirs can be sucked out and rinsing liquid poured into the reservoirs is pulled through the entire system for a thorough rinsing of the machine. This is done at the close of a run. In use, the proper reagents are placed in their respective reservoirs, namely calcium chloride solution of M/40–M/50 for reservoir 29 and a suspension of tissue of thromboplastin in reservoir 28. The amount of each supply of these reagents in the reservoirs 28 and 29 can easily be observed since the plastic 30 is transparent and the operator therefore observes the supply of reagents available and can avoid running low. The support of the plastic block 30, containing the reservoirs 28 and 29 is well forward of the front panel 11 and permits air at room temperature freely to circulate around the reservoirs, and the reagents are therefore kept at room temperature until drawn into their tubes 25 and 27 respectively, during operation of the machine. The rear end of the center tube 26 is connected to a source of vacuum, and the front end of the center tube 26 extends upwardly and is connected to a small diameter metal tube 36 which is rigidly supported at the grommet 37 on front panel 11. The tube 36 is bent downwardly at an angle and acts as a sipping tube for drawing in the sample of the plasma which is to be tested.

The tubes 25, 26 and 27 are, in effect, "pipets" into which the thromboplastin suspension, the plasma sample and the calcium chloride solution are, respectively, drawn in by negative pressure induced in these "pipets." In the case of tube 26, the negative pressure is induced therein by a vacuum applied to its rear end. In the case of tubes 25 and 27 the negative pressure is induced by roller 44 traveling back (left-to-right) along the tubes, which upon opening due to resiliency, when the roller has passed, will induce a negative pressure therein. Each tube has its "inlet end" (which is the left end in the drawings) and a side "delivery outlet," i.e. 25B, 26B and 27B. All three tubes are simultaneously squeezed by the pumping roller 44 and all three tubes can be simultaneously occluded, i.e. closed, at their inlet ends by occluder 01 and closed at the outlets 25B, 26B and 27B by occluder 02. Thus each tube may be considered as a pipet of resilient material having a means for inducing negative (suction) pressure therein and having a means of closing its inlet and an outlet near the inlet end with means for closing off said outlet.

As shown in FIGURES 2, 4 and 5, the three tubes 25, 26 and 27 rest in spaced parallel relationship lengthwise along the supporting plate 16, which as previously mentioned is arranged to be electrically heated and maintained at a constant temperature by suitable thermostatic controls, not illustrated. The tubes, which have been resting in contact with the plate 16 and in the confined and hence warmed atmosphere in the box, are at elevated temperatures. Accordingly, when plasma, thromboplastin suspension, and calcium chloride solution are drawn into tubes 26, 25 and 27 respectively, three reagents are, within a few seconds, heated to a testing temperature of approximately 37.5° C., appropriate for the testing operation. The temperature used, according to the testing procedure employed, and the heating controls for plate 16 are appropriately adjusted to maintain such temperature.

Above the front end of the plate 16, there is a mounting bracket 38 having a wide base and an upwardly extending portion, and at the rear end of the plate 16 there is a cooperating upwardly extending bracket 39, see FIGURES 2, 3 and 5. These brackets serve to support a horizontal slideway or, what is known in the trade as a ball bearing spline 40, which is pinned to the brackets. This spline 40 has in it three equally spaced and very accurately milled grooves 40A, 40B and 40C. Upon the spline there is mounted a slider 41, which has inside of it low friction bearing members 41A–41C. The slider 41 and spline are standard articles of manufacture, purchased from other manufacturers. The entire purpose of the spline and slider 41 is to provide a very low friction and accurately movable crosshead 41 capable of translatory motion, back and forth, between the full line and dotted line positions as shown in FIGURE 2 and without rotation about the axis of the spline 40. The crosshead 41 is provided with downwardly extending portions 41D, see FIGURES 2, 4 and 5, which serve as a mounting for the shaft 42, and upon which roller 44 is rotatably mounted. The height of the spline 41, and the diameter of the roller 44 are such that the roller will press downwardly upon the three plastic tubes 25, 26 and 27 when it moves into engagement with them, and in so doing will squeeze them closed and in rolling along their length will produce a pumping effect, either suction or pressure, depending upon the direction of movement of the roller 44.

For moving the crosshead 41 and the accompanying mechanisms forward and then backward on the spline 40 there is provided a constantly operating motor 100 which has a self-contained clutch 100A as best shown in FIGURES 3, 4 and 10A. The motor-clutch assembly, which are contained in one housing, are mounted by screws 100B on the central frame panel 12. The output shaft 101 of the motor-clutch combination is provided with two cams, the first being cam 102 having adjustable leading and trailing cam faces 102B and 102A, respectively, which operate switches 110–111, and the other being cam 104 which operates switch 109. At the outer end of shaft 101 there is pinned a crank 105, having a crank pin 106 connected through the connecting rod 107 to a drive pin 108 on the crosshead 41. The motor 100 is operated constantly while the machine is in use and when the clutch 101A is energized, the shaft 101 will instantly be turned. After turning a few degrees cam 104 operates switch 109 which maintains the clutch 101A energized until the shaft 101 has made one complete revolution, after which the clutch is deenergized and the apparatus halts in the position shown in full lines in FIGURES 2, 3 and 5, and as shown in FIGURE 10A.

Referring to FIGURE 9, this figure illustrates the construction used for manufacturing each of the three tubes 25–27. In FIGURE 9 the tube T (which will be understood to be any one of tubes 25, 26 or 27) is the tube upon which the roller 44 rolls to produce the pumping action. Along the length L of the tube, at a distance FE from the front end, there is attached a smaller delivery tube D (which corresponds to tubes 25B, 26B or 27B), extending downwardly a distance DD below tube T. At the lower end of the delivery tube there is inserted a metal delivery nozzle which can simply be a small metal tube N that is ground to a bevel so as to have a sharp edge at its outlet. The tube D is fastened in pressure tight relation to the tube T by being inserted into a small aperture 45 therein, and the joint between the tubes D and T is then sealed by cement at 46. In a practical embodiment of the invention the length L is made 12 inches for all tubes. The tubes are then trimmed off at the ends when fitting into the machine. The dimension FE is made approximately four inches. The dimension DD is made approximately one inch. Both of the tubes T and D can be composed of silicon rubber tubing. The adhesive 46 can be silicon rubber cement. The tube T in the practical embodiment will have an outside diameter of 0.095″ and an inside diameter of 0.062″, and the delivery tube D will have an outside diameter of 0.037″ and an inside diameter of 0.020″. Care is taken in assembly that the adhesive 46 does not enter the joint 45 and plug the tubes T or D. This may easily be accomplished by inserting a wire mandrel in each of the side delivery (small) tubes during the assembly and cementing operations, after which the mandrels are withdrawn.

In a practical embodiment all of the tubes will be of the same diameter where the work to be done is the carrying out of prothrombin time tests, but in other testing it is perfectly feasible to use tubes of different diameters, or the open area of the tube may be varied, for the purpose of varying the proportions of the ingredient used in the test.

Immediately below the position along which the tubes 25 and 26 are positioned on the plate 16 (at the position of section line 4—4 of FIGURE 2) there are drilled downwardly extending holes of just sufficient diameter so as to receive with slight clearance the delivery tubes 25B–26B and 27B of the pumping tubes 25, 26 and 27 respectively. On the underside of plate 16, and immediately to the rear of this position of the delivery tubes 25B–27B there is fastened a supporting block 47, see FIGURE 2, so positioned that the delivery tubes will rest against the front face of such block. At the lower forward portion of the block there is a bar 48, having guide grooves, not shown, therein which fit over but do not squeeze the delivery tubes 25B–27B, and thereby this bar will hold the tubes in the positions as shown in FIGURE 4, so that they are directly downwardly to a common delivery point, which is the test receptacle position immediately therebelow, see FIGURES 4, 5 and 10B. The bar 48 is held in place on the block 37 by screws 48A.

The block 47 also serves as a support for the pivot 50 of occluder 01, having two crank arms 51, see FIGURES 2, 4 and 5, attached thereto at opposite sides of the block. The pivot shaft 50 extends through the central frame panel 12 and on the opposite side (the left as shown in FIGURES 3 and 4) is attached to an actuator of a rotary solenoid 52 which is normally spring biased by an internal spring, not shown, to move occluder (clamp) bar 54 against the tubes 25B, 26B and 27B and squeeze them closed. The arms 51 carry the occluder (clamp) bar 54. When the rotary solenoid 52 is energized it will swing the arms 51 in the direction of arrow 55, and bring the occluder bar off the three tubes 25B, 26B and 27B, which will then open because of their inherent resiliency.

The support 38 which holds the spline 40 has at its base rearwardly extending side portions at 38A, serving as support for pivot 56 of occluder 01. Pivot 56 extends through the crank member 57, see FIGURES 2 and 5, which supports the occluder bar 58. The pivot 56 extends back through the central frame panel 12, and is connected to the rotary solenoid 59 of occluder 01. When the rotary solenoid is energized, it will turn shaft 56 in the direction of arrow 60 (closing direction) and bring the occluder bar 60 against the three tubes 25, 26 and 27, thereby squeezing them to shut off blow therethrough.

It will be noted that when the crosshead 41 on the spline 40 is in the full line position as shown in FIGURE 2, the roller 44 will be moved to the rear of the machine (the right as shown in FIGURE 2), and in such position will be just out of contact with the tubes 25, 26 and 27, at the point where they curve down through the apertures 18, 19 and 20 in the plate 16, and when the crosshead 41 is moved to the dotted line position of FIGURE 2, it carries the roller 44 to a position just short of the position where the delivery tubes 25B, 26B and 27B are connected respectively to the tubes 25, 26 and 27 and extend down through the plates 16. In other words, the point of contact of roller 44 against the tubes 25, 26 and 27 when in the dotted line position of FIGURE 2 will be slightly to the right of the front face of the support block 47 against which the delivery tubes lay. This is at section 4—4 of FIGURE 2.

Upon the supporting legs 17, and spaced downwardly below block 47, there are mounted a pair of guide rails 61 and 62, which can best be seen in FIGURES 4 and 5. These rails are spaced apart to receive a strip 64 of plastic material which has integrally formed on it the cups 64A, 64B etc. at even spaces thereon. The cups open directly into the upper face of strip 64 and the upper portion of the strip thereby presents a series of apertures, which are the openings of the cups along the strip, see FIGURE 3. The upper proximate faces 61B and 62B of the spaced guide rails 61 and 62 are provided with grooves at 61A and 62A, in which the strip 64 is held precisely for smooth endwise sliding movement, and thus the cups 64 are held neatly and accurately between the proximate faces 61B and 62B of the guide rails. Toward the rear of the machine is a subsidiary guide 65 for receiving the rear portion of the strip 64 when it is pushed into the machine, and on the front panel 11 of the machine there is a forwardly and downwardly curved similar guide 66 for holding the front portion of the strip as it moves forwardly during successive tests. For loading the machine a clean, unused strip of cups is entered into the front end of the guide 66 and is pushed into the machine and will follow the grooves 61A and 62A of the rails 61 and 62 and then enter into the guide 65 which is provided with a back stop, not shown, limiting the rearward motion, and in so doing accurately positions the front cup of the strip at a place to be advanced for the first test. For illustration, cup 64E is shown as in the testing position, and when the test is completed the whole strip is moved forward (to the left as shown in FIGURE 2) a distance equal to the cup-to-cup spacing, thus bringing the next cup 64F into the testing position.

In order to accomplish this step-by-step advancing movement of the strip 64 of cups, there is provided a two way actuated waiting air cylinder 68 mounted on bracket 69, which is controlled by the two air hoses 70 and 71 from a four way control valve 72 which is in turn actuated by solenoid 74, see FIGURES 2, 6A and 6B, 7A-7D and 10A-10C. Air under pressure is applied at connection 75. When 74 is de-energized the air is applied at connection 70 and this causes the piston 76A and piston rod 76 to retract to the position shown in FIGURE 2, and air is exhausted from connection 71, via the valve 72. When the solenoid 74 is energized air is applied at connection 71 and is exhausted at connection 70, and the piston 76A and piston rod 76 is moved to the left. Attached to the piston 76 by pin 76B are a yoke 77, which at their forward end are connected by a cross pivot 78. Between the arms there is positioned a toggle composed of a link 79 which is connected at the pivot 80 to two spaced links 81, see FIGURE 6B. The link 79 is also connected at pivot 84 to a central downward protuberance 85 of the slide block 86. The slide block has pins 87 extending therethrough, the ends of the pins extending slightly so as to slide along grooves provided in the rails 61 and 62, of which the groove at 88 for rail 62, is shown in FIGURES 5 and 7A-7D. The construction is also illustrated in FIGURE 6B. The pins 88 extend through these grooves, and the block 86 thus is permitted to move backward and forward within the limits of the grooves. The slide block 86 has a vertical aperture in which there is positioned vertically slidable dog 89 which is movable from a lowered position such as shown in FIGURES 7A and 7D to a raised position such as shown in FIGURES 7B and 7C. The dog 89 and its lower end rests against line 81 of the toggle mechanism as shown in FIGURES 7A-7D. When the toggle is in the "broken" or lowered position, as shown in FIGURE 7A, the dog 89 is retracted (down) and its upper end 89A which is notched at the left is retracted downwardly, so as to be slightly below the bottom of the cups in the strip 64. When the toggle is brought to a more straightened position, as shown in FIGURES 7B and 7C, the dog 89 is raised so that it will engage against one of the cups in the strip. The mode of operation is this: The slide 86 has a certain amount of friction, and this is increased by a friction brake 90, see FIGURE 6B, which pushes lightly against the smooth inner face 62A of rail 62, acting as a light brake. Assuming the parts are in the configuration of FIGURE 7A, the toggle is in the "broken" or lowered position. When air is admitted against the right side of piston 76A the piston rod 76 and everything attached to it, which includes the arms 77 and pivot 78 will be moved toward the left as shown in FIGURE 7A, etc. At this time pivot 78 rests against a vertical surface 86B of the slide block 86, but the pivot 78 is free to move away from this surface, i.e. to the left as shown in FIGURE 7A, and it does so, the slide block 86 meanwhile standing still, due to the drag of the brake 90 against rail 62. This pulls the toggle from the position shown in FIGURE 7A to the position shown in FIGURE 7B, thus elevating the dog 89 so that its upper end 89A will be in a position just behind one of the cups in the strip 64. At this time there is slight clearance at C between the dog 89 and the cup most adjacent to it, which it is shortly to engage. This is shown in FIGURE 7B. With the dog thus elevated, the toggle is thereby extended up as far as it will go, and piston force overcomes brake 90 and motion is imparted to the slide block 86. The movement of the pin 78 away from the surface 86B, see FIGURE 7A, decreases the dimension from L, FIGURE 7A, the lesser dimension S, FIGURE 7B. This is the amount of motion of the toggle pivot 78 in moving from the "broken" to the "straightened" positions of the toggle in FIGURES 7A and 7B respectively. With the toggle thus straightened the force will then be imposed on the slide block 86, which then is moved from the position shown in FIGURE 7B, guided by slots 88, to the position shown in FIGURE 7C, and dog 89A, being against the cup 64E, will move from the testing position of FIGURES 7A and 7B to the next forward position, as shown in FIGURE 7C, and cup 64F is thus brought into the testing position immediately below the delivery nozzles of the three delivery tubes 25B, 26B and 27B mounted against support blocks 47. Then when the supply of air at line 71 is interrupted and air is applied to line 70, the piston 76A and everything attached to it will be moved to the right as shown in FIGURES 7A–7B. In so doing, at the beginning of such motion, the bars 77 and the pivot 78 are moved to the right from the position shown in FIGURE 7C to the position shown in FIGURE 7D, slide block 86 being meanwhile restrained by brake 90, until the pin 78 contacts against the stop surface 86B, after which the entire slide block 86 will be moved back to its starting position as shown in FIGURE 7A. In so doing, dog 89–89A is retracted and the block 86 then moves back to the FIGURE 7A position.

Also attached to the slide block 86 is a bracket 91 to which there is attached the vertically extending drain tube 92 having the configuration as shown in FIGURES 6A, 6B and 7A–7D. This drain tube has its lower end permanently connected by a flexible tube to a source of vacuum, and its upper end enters directly into a combined drain pan and test cup cover 94, which has a rectangular configuration as shown in FIGURE 6A, sufficient to cover the cup openings in strip 64. This pan 94 accordingly follows the motion of the slide block 86. While the testing operation is being conducted, the test pan 94 is in the position shown in FIGURE 7A, being at this time directly over the cup 64E which has already been filled with the testing ingredients, and is undergoing tests. In this position the drain pan 94 covers the cup 64E of the test position, and prevents anything from being splattered into it, which might disturb the test. At the same time, it is entirely possible to rinse the plasma supply tube 26 with saline, which can then be ejected out through the delivery tube 26B, into the drain pan 94. Incidental to this the supply of other ingredients from tubes 25 and 27 will also be discharged through their delivery tubes 25A and 27A respectively, but since these are inexpensive they are merely wasted, and this is of no real consequence. For rinsing the plasma tube 26–36, etc., the operator holds a cup of saline at tube 36, and vacuum applied to the rear end of tube 26 (FIGURES 5 and 10A) and roller 44 and occluder 01 being then disengaged from all of the tubes 25, 26 and 27, the saline is pulled through tube 26. By interrupting the inflow of distilled water, i.e. by letting in air bubbles but ending with tube 26 filled with saline, cleaning is enhanced. The machine is then put through its "Rinse" cycle and the saline used for the rinsing operation is discharged from tube 26B thus also cleaning tube 26B. The thromboplastin suspension and calcium chloride solution which are incidentally drawn into tubes 25 and 27 respectively during the "Rinse" cycle are also expelled during the rinsing operation along with the distilled water from the tube 26B, directly into the pan 94, from which they are sucked downwardly through tube 92 and thence to vacuum.

Referring now to FIGURES 10A, 10B and 10C, these figures illustrate the general organization and wiring of the machine, and should be positioned with 10A at the top, 10B next below, and 10C at the bottom, so as to have the complete diagram in proper relation. In FIGURE 10A the motor 100 drives through the clutch 100A to shaft 101 on which the cams 102 and 104 are mounted. To the outer end of the shaft there is keyed the crank 105 on which the crank pin 106 is connected by means of the connecting rod 107 and crosshead to move roller 44 from the stopped position of FIGURE 10A, thence to the left and then back to the right along tubes 25, 26 and 27, to accomplish fluid pumping and delivery action of the machine. Power is supplied by lines X1 and X2 to motor 100 while the machine is in use, through suitably fused and switched controls, not shown. At the clutch 100A a circuit extends from line X2 through clutch 100A, and line 112 and junction 114 to the contact E of the timer generally designated 115. The timer is drive by a timer motor M4, the circuit of which extends from line X2 through motor M4 and line 117 to junction 122, which is supplied through normally open contact K1A of relay K1 and junction 118 to line X1. Line X1 also connects at 119 to cam strip 120 of the timer which serves contact B of the timer, contact B being connected through line 121 to junction 122 and thence through line 117 to the timer motor M4. When relay K1 is energized, contact K1A is closed and this supplies power from line X1 through junction 118, contact K1A and junction 122 and through motor M4 to line X2, and the timer motor then begins to revolve. When the timer has operated for less than 1 second the leading edge of strip closes against contact B and accordingly a self-sustaining circuit is made for motor M4 from line X1 through junctions 118, 119, strip 120, contact B and line 122 to motor M4, and the timer motor will then continue to be energized for the full cycle of operation.

In FIGURE 10B the numerals appearing above the timer cam 120 are intended to designate seconds, one complete revolution of all cams, which turn together, being 20 seconds. This total time is chosen as sufficient to afford a complete starting of the testing operation, which after being started proceeds independently as will be described. For other testing operations, different timing may be utilized, as needed.

Once started the timer motor M4 drives through appropriate gearing 124 and simultaneously all of the cams 120, 125, 126, 127, 128 and 129 as though to the left, in FIGURE 10B, through one full revolution and in so doing these cams operate timer contacts D–A–C–D–E–F respectively. The timer cams and contacts are shown schematically in FIGURE 10B and in so doing line X1 is therefore illustrated as being connected through junctions 118 and 119 to cam 120, the operation of which has been described, and through junction 130 to cam 125, through junction 131 and to junction 132 to cam 127; through junction 134 to cam 128, and through junction 135 to cam 129. It will be noted that cam 126 is not connected to line X1, but is instead connected via line 136 to junction 137. In the instance of cam strip 126, its cooperating contact C is connected to —6 volt supply. As illustrated the contacts A–F will be understood to make contact with the left ends of the cam strips (FIGURE 10B) and then maintain such contacts throughout the wide portions of the cams as shown for the cams. In actual practice it is usually more convenient to use cams for operating microswitches to accomplish the same result, but for illustration the circuits are shown as going through the cam strips.

For operating relay K1, there is provided a transistor at amplifier 138 having its collector connected to a 50 volt supply and its base connected to a first signal terminal 139, the emitter of the transistor being connected through the coil of relay K1 and then to the second signal terminal 140 of electronic relay 141. The electronic relay 141 is a standard electronic holding circuit which provides the electronic equivalent of a normally open, immediate close, one-two second time delay (adjustable if desired) opening signal output whenever it receives an input signal at terminals 142–144. In this instance the input signal circuit is derived from completion of circuit through the plasma tube 36–26–147, the circuit being from ground G, through input terminal 142, input terminal 144, thence through a normally open-manual close push button 145, then via line 146 to metallic tube 147, which is a short segment of metallic tube connected to the rear or vacuum connection end of the plasma sample tube 26. The circuit then continues through the plasma sample in tube 26 to the metal tube 36 which is grounded at G. Assuming that vacuum is applied to the rear or exhaust end of the tube 26, and that a plasma sample in a suitable receptacle R has been brought to the lower end of tube 36, the plasma sample will be drawn through the tube 36 and thence through tube 26 to and through the short metallic tube segment 147 and then to vacuum. While the operator holds the receptacle R for thus introducing the plasma sample, she must also hold the push button 145 closed. When the plasma sample has been drawn back so as to fill the tube 26 back to the short metallic connection 147, the aforesaid circuit will be established and this initiating signal is then maintained for a one to two second (adjustable as needed) period by electronic circuitry 141. This provides an output energization at terminals 139–140 which, upon amplification at transistor 138, energizes the coil of relay K1 and accordingly operates that relay. This closes contacts K1A as previously described, causes the timer motor M4 to revolve and during said one-two second initiating period the contact strip 120 reaches the contact B, and a self-sustaining circuit is maintained for the motor M4 thus insuring a full cycle of operation of timer 115.

The strip 64 having the test cups therein, is assumed to be in the machine, and the test cup 64E is in the testing position as indicated in FIGURES 2, 5, 7A, 7B and 10A. The rails 61 and 62 are provided with suitable apertures and bracketing, not illustrated, for supporting adjacent one rail a lamp 145, see FIGURE 10A, which through the light filtered lens system 146 of which there is projected a beam of light 147 against, and thence through, the test cup 64E and the plasma test mixture therein. The emerging beam of light 147A, the amount of which depends upon the light transmissibility of the mixture being tested, is projected onto the receiving aperture of the photo-electric cell 148, which has one terminal grounded, and an output line 149 which is shielded at 150. This output line is connected to the input terminal 151 of a signal input differentiator and amplifier generally designated 152, which is built integral with and connects to the input of a signal filter and sensor 154, which are the subject of copending application of Anders B. Ness, Ser. No. 577,575, filed Sept. 1, 1966, executed of even date herewith, the details of which are incorporated herein by reference. In lieu of the combined unit 152–154 there may be utilized the circuitry, as in FIGURE 6 or 7 of the copending application of Charles A. Owen and James Isaacson, Ser. No. 364,564, filed May 4, 1964, now Patent No. 3,307,392, which is likewise incorporated herein by reference.

For convenience the two devices 152–154 are conveniently contained in one housing and are supplied by an input of requisite voltage (i.e. +33 volts filtered and regulated supply) at 155, and a negative input signal terminal at 156, which when energized will bias unit 152–154 sufficiently so as totally to suppress any output signal from the terminal 157. The net effect of the instrumentation at 152–154 is to provide a signal at 157, when the curve of the light transmission signal received at 151 changes from convex downward to convex upward, i.e. when the first derivative signal reaches a minimum (in a negative sense) or alternatively, when said curve changes from convex upward again to convex downward, i.e. when the first derivative signal reaches a maximum after the first minimum (in a negative sense). This is achieved by first differentiating the input signal received at 151, to provide a second signal, as set forth in the said application of Owen and Isaacson, Ser. No. 364,564, filed May 4, 1964 now Patent No. 3,307,392, and in the copending application of Ness aforementioned, and from this first derivative signal the end of the prothrombin time is determined, when such first derivative signal reaches a point of minimum in a negative sense, or reaches a point of maximum after first minimum in a negative sense.

The output signal at 157 is impressed through resistor 158 and junction 159 and thence through capacitor 160 to ground G. From junction 159 the circuit extends through resistor 161 to the base of transistor 162 and thence through the emitter 164 to ground G. Supply of +50 volts at 165 is provided through resistor 166 to the collector terminal 167 of transistor 162, and from such junction a line 168 extends to the input of transistor 169, the collector of which is likewise supplied with +50 volts via line 170 and has its emitter 171 connected via line 172 through junction 174 to one terminal of the coil of relay K3, and thence through the coil and junction 175 to ground G. A diode at 176 is connected between junctions 174 and 175 to receive the inductive discharge of relay K4 and thus protect transistor 169 when relay K4 is de-energized. The energization of relay K3 opens the normally closed contact K3A, and as will later be seen, signals the end of the "prothrombin time" interval.

On the timer switch, the cam 129 has only a short segment, here indicated as a 1 second interval between the 4–5 second periods. The position and length of this cam is adjustable. The purpose of cam 129 is to start the timing operation for determining the "prothrombin time," at a certain adjustable time after the mixture has been put in the test cup, and the clotting reaction has already initiated, so as to permit the "prothrombin time" as measured by the machine, to be correlated with the time as measured by conventional laboratory procedures. While the cause for this is not definitely known, it may be because a photoelectric cell sees light differently than the human eye. In order that the "prothrombin time" readings as determined by the present invention may be easily correlated the time as determined by usual laboratory methods, the beginning of the time interval as measured by the machine is arbitrarily adjusted, and this adjustment is achieved by positioning the cam 129 relative to the actual start of the test interval, so that the machine "time measurement" of the prothrombin time matches that of usual testing.

Thus when cam 129 reaches the contact F, a circuit is established from line X1 through junction 135 and cam 129 to contact F and thence through junction 176 and the coil of relay K2 to line X2. The cam 129 is short and therefore only maintains its engagement with contact F for a short time, but once relay K2 has operated, it closes its normally open contact K2A thus establishing a holding circuit from X1 through terminal 2 of the plug 180 thence through manually operated push button 178, which normally is closed against the contact 179 thence through terminal 1 of the plug 180, and through the then closed contact K3A of relay K3 thence through the closed contact K2A and the coil of relay K2 to supply X2, thereby maintaining relay K2 energized. K3 opens at the end of prothrombin time. The opening of "print" button 178 while K2 is closed performs a reset action for the entire machine in case of error, and can be used for this purpose in addition to its primary function. The relay K2 may thereafter be de-energized by K3A or when the operator presses the push button 178 either to print out the "prothrombin time" reading or to clear an error. Opening push button 178 breaks the circuit of relay K2 at contact 179, and establishes a circuit at 181, to initiate a circuit from line X1 to terminal 2 of the plug 180, thence via push button switch 178–181 which is then closed, then through motor 182 to junction 184 and via terminal 3 of the plug 180 to line X2. The print motor 182, once set in operation, will through appropriate cams close the switch S4A, which maintains the print motor circuit from line X1 through switch S4A and contact 185 and through the circuit described for one full revolution of the print motor. The full cycle of operation of the print motor has the effect of printing out the indication of the digital indicator 185, which is driven through the clutch 186 energized by the coil 186A. Timer motor 187 runs constantly through a circuit from line X1 and through terminal 2 of plug 180, thence through junction 188 and line 189 to through the timer motor 187 and via junctions 190 and 184 and terminal 3 of plug 180 to line X2. Therefore, as long as the plug 180 is connected, the timer motor operates, but it does not drive the digital indicator until the clutch 186 is energized, and whenever the clutch is de-energized the digital indicator ceases to advance. The operation of the print motor also serves to open the switch S4B, which is normally closed. Contact S4B is in a circuit through terminals 5 and 6 of the plug 180, and through the circuit of print lamp 191 to junction 196 on the +50 supply line, as will be described. The effect is that when operator presses the print push button 178, and the printer actuates, indicator 185 resets to zero, and the print lamp is extinguished, thus indicating that the machine is ready for another cycle of operation. The entire timer printer is an available manufactured item, and per se forms no part of the invention.

The network 192 is a self-holding electronic relay, analogous to a latching relay. This network is controlled by a circuit extending from 50 volt supply thence via junction 194 and line 195, junction 196 and contact K2C of relay K2 (when closed), line 197, resistor 198, junction 199, resistor 200, junction 201 and resistor 202, junction 204, junctions 205 and 206 to ground junction 207. Accordingly when relay K2 is energized and its contacts K2C are closed, the aforesaid circuit will be established and supplies a signal at 201 which causes the electronic circuit under the bracket 208 to become conductive, thereby establishing a circuit from supply junction 196 through print lamp 191, terminal 5 of plug 180 of the timer printer, thence through the then closed contact S4B of the timer printer and through terminal 6 of the plug 180 and resistor 209 through junctions 210 and 211 and transistor 212 to junction 214 and to ground 207. Once initiated this circuit will thereafter remain conductive so long as the contact S4B remains closed, even though relay K2 is later on de-energized and its contact K2C opened. When the operator presses the print push button 178 to carry out the printing operation, this clears (extinguishes) the print lamp 191 and incidentally opens the self-holding circuit for relay K2.

The network at 215 is slightly different than that at 292 in that only a single voltage pulse transmitted via condenser 222A, resistor 222B, junction 222C and resistor 222D to ground junction 206 is required to initiate via collector 223, the operation of transistor 221, which therefore remains conductive and maintains a circuit through "rinse" lamp signal 216. When illuminated lamp 216 indicates that the rinsing operation should be carried out, before initiating another test. The circuit through lamp 216 is from supply terminal 194 through the normally closed contact S1B of the push button 218, which also has a normally open contact S1A. When this push button is manually pressed it will close contact S1A, to initiate the rinsing cycle, as will be described, and simultaneously open contact S1B to extinguish the rinse lamp 216. The initiation of the circuit to the rinse lamp from supply terminal 194 through then closed contact S1B, rinse lamp 216 and transistor 221 occurs because of the voltage pulse via 194, 195, 196, K2C, 197, 198, 199 and 222, as previously described when relay K2 is energized.

In FIGURE 10C (immediately below network 215) a circuit extends from supply X1 through normally open push button 224 through junction 223, winding 225 of the air valve 72, and thence to supply X2. When the push button 224 is closed, the air valve 72 is actuated, with the result that the cup advance mechanism generally designated 68, see FIGURE 10A and FIGURES 7A–7D, will go through a cycle of operation, and moves the strip 64 with the cups thereon a distance of one cup, to push the cup which has been filled and already tested to an advanced position, and bring into the testing position an unfilled cup.

A circuit also extends from junction 223 via line 232 to contact A of the timer switch 115, and thence via the timer cam strip 125 and junction 130 to line X1. Accordingly at an appropriate time, from the second to the eighth second in the operation of the timer switch, the coil 225 is also energized.

If desired, there may be provided a signaling system, not illustrated, actuated so as to initiate a signal when the trailing end of the strip 64 of cups reaches a position indicating that the last cup in the strip has been brought into testing position. Such a signal, where used, will inform the operator of the necessity of withdrawing the used strip of cups and inserting fresh strips. The same signaling circuit, not illustrated, may be used for de-energizing the cup advance mechanism and the entire testing system, in the event another strip of fresh cups is not inserted.

Referring to FIGURE 10A, a motor 100 is energized so long as the plug connection to lines X1 and X2 is in place. However, the clutch 100A is only energized when the circuit thereto is established from line X2 through the clutch and thence via line 112. The completion of the circuit via line 112 can be made either via the push button 218, by manual closure, which completes the circuit to supply X1, or the circuit may be completed via junction 114 and contact E, cam 128 and junction 134 to line X1, as when the timer drive motor M4 is operating, and also once the clutch 100A has been energized and the shaft 101 is rotating in the direction of arrow 226, cam 104 will move to a position where it closes the normally open switch 109, and this will also establish the circuit from junction 113 through the then closed switch 109 to supply X1. Accordingly, whether the rotation of shaft 101 (through energization of clutch 100A) has been initiated by the push button 218, or whether it has been initiated by operation of the timer switch 115–M4–128–E, once the shaft 101 has turned a few degrees, the cam 104 will move switch 109 to closed position, and thereafter the shaft 101 will continue to rotate until it has made a complete turn and the switch 109 again opened by the depression of cam 104 arriving at the appropriate spot. In so doing, the crank 105 is rotated with attendant movement of the pump roller 44 as moved from its starting position, where the roller 44 has just withdrawn (to the right as shown on these figures) from the tubes 25, 26 and 27, thence the roller will move to the left to the dotted line position shown in these figures and thence back again to the right to its parking position where the pumping cycle is complete. This has the effect of squeezing out of tubes 25 and 27 the thromboplastin dispersion and calcium chloride solution which has previously been drawn into these tubes, and the effect of squeezing out of tube 26 the plasma which was drawn into that tube. The cycle is accompanied by the operation in timed sequence about occluders 01–59–58 and 02–52–54. Occluder 01 is, in effect, a valve which presses against and closes off the tubes 25, 26 and 27 whenever the occluder rotary solenoid 59 is energized. The occluder 02 is likewise a valve which presses against and closes off the delivery tubes 25B, 26B and 27B opening whenever the occluder rotary solenoid valve 52 is energized.

The energization of the occluder rotary solenoids is accomplished by the switches 110 and 111, which are in turn operated by cam 102. The cam 102 has a high portion and a low portion and when the slider 227 is on the high portion then the machine is at its stopped position at the end of a cycle and the beginning of the next cycle. In this position cam 102 holds the contact 110 open, and through the link 113 holds the contact 111 open. Each of these contacts is provided with an adjustment as at 110A and 111A respectively, by which the precise timing of opening and closing of the switches can be very accurately adjusted. The leading edge 102A and the trailing edge 102B of the cam 102 are also adjustable so that the precise position at which the switches 110–111 are operated in the cycle, to close and also to open, can be varied. The circuit through switch 110 is from line X1, thence switch 110 and line 228, junction 229 and line 230 through rotary solenoid 59 to supply X2. It will also be noted that line 228 connects through junction 231 to contact D of the timer switch 115. From 231 a circuit extends through contact K1B of relay K1, then through junction 131, line X1. Accordingly, from line X2 and rotary solenoid 59 a circuit extends to the junction 229 and this circuit may be closed back to line X1 either by the operation of switch 110 or by the operation of relay K1, or by the operation of the timer switch 115, contact D and segment 127.

From the rotary solenoid 52 of occluder 02 a circuit extends from supply X2 through the rotary solenoid and switch 111 to supply X1, and therefore this rotary solenoid will only be energized and remain energized due to operation of switch 111, for approximately ½ turn, beginning when the cam slider 227 passes off of the trailing shoulder 102A of cam 102 and ending when the slider reaches the shoulder 102b at the leading edge of the cam.

Referring to FIGURES 8A–8F, in these figures, as in FIGURES 8G–8K, for simplicity in illustration, there is illustrated only tube 26 and its delivery tube 226B, but it will be understood that tube 26 also illustrates the thromboplastin dispersion tube 25 and the calcium chloride solution tube 27, which can be considered as situated behind the tube 26. All three tubes are operated simultaneously by occluder 01–58 and occluder 02–54 and they are simultaneously pressed upon by the roller 44. In all of these FIGURES 8A–8K, the actual delivery orifice, which is in the form of a sharpened hypodermic needle N–A, see FIGURE 9, has been omitted to simplify the illustration. It is also assumed in the description of the testing cycle, FIGURES 8A–8F, that the machine has previously gone through a rinsing cycle, and that tube 26 is clean, but unfilled, and that tubes 25 and 27 have, by the pumping action of roller 44 on its return stroke, had drawn into them the thromboplastin dispersion and calcium chloride solution respectively, and that the test is then ready to proceed.

Referring to FIGURE 8A, the test cup 64D of the previous test, and containing the mixture of ingredients previously tested is still in place, and the rinse pan 94 is in its position about this cup. The test cup 64E of the test to be initiated, is on the strip 64 ready to be moved into position.

The operator then deliberately closes the "sample" push button 145, and simultaneously holds the receptacle containing the plasma sample at the lower end of tube 36. Due to the constant application of vacuum to the rear end of the tube 26, the plasma is drawn through tubes 36–26–147 to the vacuum. As soon as the plasma reaches the metallic section 147 a circuit is established from ground, thence through tubes 36 and the plasma in tube 26 to the tube 147 through the then closed push button 145 to terminal 144 of the electronic holding circuit 141, and thence via terminal 142 to ground. This input signal to the holding circuit 141 provides an output signal between the terminals 139 and 140 which is sustained for 1–2 seconds, which can be adjusted as desired. This output signal is amplified at transistor 138 and is applied to the coil of relay K1, which accordingly actuates closing its contacts K1A and K1B. The closure of contact K1A establishes the circuit from X1 through junction 118, K1A, junction 122 and motor M4 to line X2, thereby starting the timer drive motor M4. The closure of contact K1B establishes the circuit from X1, junction 131, K1B, junction 231, line 228, junction 229 to the rotary solenoid actuator of occluder 01–59–54, which accordingly immediately actuates, being normally spring biased to the open position. Occluder 01 presses against the three tubes 25, 26 and 27 thereby closing them off, to the position shown in FIGURE 8B. It is noted that the occluder 02–52–54 is normally spring biased to closed position (FIGURES 8A–8B) and is only opened when its rotary solenoid actuator 52 is energized.

The actuation of timer M4 then moves all of its contact strips, and the leading edge of strip 127, within the time period provided by the holding circuit 141, meets contact D, thereby establishing a parallel circuit around contact K1B, to maintain the circuit to occluder 01, which had been initiated through contact K1B. This circuit will be maintained until contact D leaves the trailing end of the strip 127, at the 5 second position of timer 115.

As the timer continues to operate the strip 120 soon meets contact B, thereby providing a holding circuit around contact K1A, and this circuit will maintain power on the timer drive motor M4 insuring operation for the full 20 second interval, constituting one cycle or revolution of the timer 115.

The next occurrence in the cycle is when the strip 125 meets contact A, which has the effect of establishing a circuit from line X1, junction 130, strip 125, contact A, line 232, junction 223, the solenoid coil 225 of the air valve 72 and line X2. The air valve 72 is accordingly moved from the position of FIGURE 7A, through the positions of FIGURE 7B to the position shown in FIGURE 7C, which accordingly causes the drive pin 89A to engage the cup 64D and move it, along with the drain pan 94 to the position shown in FIGURE 8B. This has the effect of positioning the test cup 64E under the delivery tubes 25B–26B–27B of the three ingredient measuring tubes 25, 26 and 27 respectively. The air cylinder actuator 68–76 will remain in the position of FIGURE 7C until the trailing end of strip 125 of the timer leaves contact A, at approximately the 8 second point in the timing cycle.

It will be noted that at this time relay K2 is in the de-energized condition, and therefore its contact K2D is closed, and as a result —6 volts power supply is provided from the supply terminal through contact K2D to junction 137 and to the input terminal 156 of the signal sensor 152–154, and as a result the signal output is suppressed, and no signal is supplied at the output terminal 157. This is because after the completion of the previous test, it is desired that the unit 152–154 be in effect deactivated, and this was done when, in the previous test, relay K2 became de-energized. From junction 137 the circuit extends to contact strip 126 of the timer, and as this strip reaches contact C the same —6 volt power supply is then also supplied via contact C to junction 137 and thence to input 156, but this has no immediate effect, since —6 volts was already being supplied. The trailing end of the contact strip 126 is the effective end and determines the end of the time period during which the application of —6 volt signal suppressing input is made, and by this time also the relay K2 will have been energized, as will be explained.

Up to this time, namely approximately the third second in the testing procedure, the ingredients in the three tubes 25, 26 and 27 have merely been contained in their tubes, resting upon the support plate 16, which is maintained at a controlled temperature, and the tubes and consequently the ingredients in them are brought up to the desired testing temperature of approximately 37.5° C.

When the contact strip 128 of the timer reaches the contact E, a circuit is established from X1 through junction 134, strip 128, contact E to junction 114 and via line 112 to the clutch 100A and to line X2, which accordingly causes the clutch to engage and start the rotation of shaft 101. The shaft 101 rotates, and within the time period provided by the length of contact strip 128, the slider against cam 104 closes switch 109, which accordingly provides a self-holding circuit from line X1 to junction 113 and thence through line 112 to clutch 100A, thereby maintaining the clutch energized until switch 109 is again opened at the end of one complete rotation of shaft 101. The motor and clutch 100–100A will accordingly drive shaft 101 through one complete revolution, thereby moving the pump roller 44 successively through the positions shown in FIGURES 8A through 8F and thence back to the position of 8A. This operation, being controlled by cam 104, is thereafter completely independent of the operations which are controlled by the timer 115.

The cam strip 129, which times the "beginning" of the "prothrombin time" measurement is adjustable in length and position along the scale. The time period from the zero point to the leading edge of strip 129, here illustrated as four seconds, may be adjusted for the purpose of correlating the "prothrombin time" readings obtained by this machine, with corresponding readings as determined by ordinary laboratory procedures on the same samples. Therefore, it will be understood that the position of strip 129 of the timer may be moved as desired so as to accomplish such correlation.

In FIGURE 8B, the occluder 01–58 is in the position where it closes off the tubes 25–26–27 and the occluder 02–54 is in the position where it closes off the delivery tubes 25B–26B–27B and pump roller 44 is in position R0. As the pump roller 44 begins to move, by virtue of rotation of shaft 101, it comes to the position R1, of FIGURE 8C, where it begins to squeeze off the rear ends of the tubes 25–26–27. This builds up a slight pressure on the liquid contents of these tubes, which is desired in order to achieve a higher velocity of ejection of the contents of the tubes upon opening of occluder 02–54.

As the shaft 101 rotates, the trailing edge 102A of cam 102 left the position of slider 227, and this causes the closure of the two switches 110 and 111. The closure of the switch 110 at this time causes no change in function of the machine, since the rotary solenoid 59 of occluder 01 has already been energized by the closure of relay contact K1B and subsequently by the sustaining circuit through timer strip 120 and contact D. It will be noted, however, that the contact strip 127 will leave the contact B before switch 110 is later on to be opened by the leading edge 102B of contact 102 meeting the slider 227. Consequently the switch 110 is effective for opening the occluder 02 by energization of its rotary solenoid, at the end of the cycle.

The closure of switch 111 makes the circuit through the switch and to the rotary solenoid 52 of the occluder 01, thereby lifting the occluder away from the delivery tubes 25B–26B–27B, and the liquid in the tubes 25–26–27 respectively, which are already under slight pressures due to the roller 44 moving to the left as shown in FIGURE 8C, are ejected from these tubes into the awaiting cup 64E.

FIGURE 8C shows the beginning, just prior to the opening of the occluder 02–54. FIGURE 8D shows the condition after the roller 44 has moved to position R2, at an early stage of the cycle of delivering the three liquid ingredients into the cup 64E. The roller 44 then continues to move toward the position shown in FIGURE 8E, and the delivery of the three liquids is continued, filling the cup to 64E. Then as the leading edge 102B of the cam 102 meets the slider 227, it opens both the switch 110 and switch 111.

It will be noted that there are provided adjustments at 110A and 111A for "timing" the closure of these switches, since they are operated by a common cam face.

Opening of the switch 111 de-energizes the rotary solenoid of occluder 02 and as this occluder closes under spring pressure, it closes off the three delivery tubes 25B–26B–27B, as shown in FIGURE 8E. The closure is very abrupt, a snap action, thereby abruptly interrupting the flows of the liquids which are still being squirted out due to the continuing movement of roller 44. This is desirable so as to minimize after-dribbling from the tubes.

In this connection reference should be made to FIGURE 9, wherein the actual delivery tube is illustrated as a hypodermic needle N sharpened to a beveled delivery point at A. This shape of delivery tube helps to minimize droplets which might otherwise form and be dribbled off, after closure of occluder 02. The roller 44 has not, however, reached its final position in FIGURE 8E, but moves further a slight distance K to the position R4 as shown in FIGURE 8F.

It will be noted that the opening of switch 110 substantially simultaneously with the opening of switch 111, causes the de-energization of the rotary solenoid 59 of occluder 01 yielding the position shown in FIGURE 8E, and accordingly when the roller 44 moves from the position R3 of FIGURE 8E to the position R4 of FIGURE 8F, there is no pressure on the inlet end of the plastic tubes 25–26–27. At the position in FIGURE 8F, the roller 44 has moved as far as it will go to the left, and the roller will then be moved back to the position of FIGURE 8A. As it does so additional supply of thromboplastin dispersion from reservoir 28 is drawn into the tube 25 and an additional supply of calcium chloride solution from reservoir 29 is drawn into tube 27. However, the tube 26, being open to the atmosphere merely draws in air. It will be noted that FIGURE 8F also shows the drain collection pan 94 as moved to a position over the cup 64E which is then undergoing the test cycle. The return movement of this drain pan, which is mounted on the cup transfer mechanism shown in FIGURES 7A–7D, is determined by when the end of cam strip 125 leaves the contact A. This is made adjustable, and is timed to occur after the cup 64E has been filled and occluder 02–59 has been closed as in FIGURE 8E, and before the roller 44 reaches the position R0, from the position shown in FIGURE 8F to the position shown in FIGURE 8A. Preferably the drain pan 94, which acts as a cover over the cup 64E, being tested, should be moved back to the covering position of FIGURE 8F fairly promptly after the roller 44 begins its return travel, so as to provide cover protection for the ingredients undergoing testing.

The movement of the drain pan 94 into the covering position of FIGURE 8F causes a slight change in the reflective and light transmitting qualities of the transparent cup 64E, thereby making a slight "light transient," and it is desirable that the effect of this slight transient be obviated before the actual measurement of light transmission through the test cup is made effective through the apparatus 152–154. It may also be noted that the amount of light transmission through the cup 64E during the actual filling operation causes wide variations in the amount of light transmitted, and consequently large variations in the output of the photoelectric cell 148. However, during this period and until after the cup 64E is filled and covered, the signal from the differentiator-amplifier and signal pass filter 152–154, are still being firmly suppressed by the —6 volt input applied to terminal 156, and consequently there is no output signal at terminal 157 during this period.

From this point on the timer 115 continues its timing operation. The next function of the timer is when the trailing end of the strip 126 leaves contact C, and this interrupts the supply of —6 volts via contact C to junction 136 and terminal 156, and consequently when the strip 126 leaves contact C, the signal input to the differentiator and amplifier, and the signal slope detector and signal sensor 152–154 then become effective, and the output therefrom is available at the output terminal 157.

It will be remembered that at this time the relay K2 is still energized. This relay was originally energized via the leading edge of strip 129 reaching contact F, but the relay, when energized, supplies its own self-holding circuit from X2 through the relay coil to junction 176 and thence through contact K2A and the then closed contact K3A of relay K3 to junction 1 of the plug 180 to terminal 179 of the print push button switch 178 and thence through junction 188 and contact 2 of the plug to line X1. Consequently relay K2 is at this time still maintained in the energized condition, with its contacts K2A, K2B, and K2C closed and its contact K2D open. The timer drive motor M4 continues to rotate until the end of strip 120 passes off of contact B, whereupon the drive motor circuit is interrupted and the cam strips stop in the position shown in FIGURE 10B, preparatory to the next testing cycle.

The timing of the test cycle is accordingly initiated, and is still going on, and will continue independently of the operation of motor 100 and the various apparatus shown in FIGURE 10A, which can also be operated independently for the rinsing operation, preparatory to the next cycle. It may be noted that during the rinsing cycle, the cup 64E is not moved from its test position.

For rinsing the tube 26, preparatory to the next test, the operator presses the push button 218, which closes the circuit from X1 to line 112 and through clutch 100A to line X2, thereby initiating the rotation of shaft 101. As soon as the shaft 101 rotates cam 104 closes contact 109, thereby establishing a self-sustaining circuit for the clutch 100A for a full revolution of shaft 101.

Before initiating the rinsing cycle, the operator will place a suitable receptacle containing saline (i.e. 0.9% NaCl solution) at the end of the tube 36, and due to the vacuum applied to the rear end of the tube 26, saline is then pulled through the tubes 36–26–147 to vacuum. The operator, by lifting and lowering the supply vessel of saline permits bubbles of air to be drawn through the tubes, thereby insuring by the alternate indrawing of saline and air bubbles, an adequate cleaning of the entire plasma tube system The operator ends this portion of the operation by filling the entire system with saline by holding the saline receptacle to the tube 36 and while so doing she pushes the rinse button 218, which starts operation of the shaft 101.

At the beginning of the rinsing cycle of the machine, occluder 01 is de-energized and hence open and occluder 02 is de-energized and hence closed, as in FIGURE 8G. As shaft 101 begins to rotate, trailing edge 102A of cam 102 leaves the rider 227, thereby closing switches 110 and 111.

The rotation of shaft 101 then continues and the roller 44 moves position R2, the solution in tubes 25–26–27 which includes the rinsing solution of saline previously sucked into tube 26, are forcibly ejected from the delivery nozzles 25B–26B–27B into drain pan 94, and hence via tubular supporting stem 92 (see FIGURES 6A–6B and FIGURES 7A–7B) to vacuum. The liquids are continued to be delivered during the movement of roller 44 from the position R2 in FIGURE 8I toward the position of R3 in FIGURE 8J, at which time the leading edge 102B of the cam 102 reaches the slider 227, and causes the opening of the two switches 110 and 111, which are "timed" so that switch 111 returns occluder 02 to the closed position slightly before switch 110 returns occluder 01 to its open position, as shown in FIGURE 8J. The roller 44 is then moved forwardly a short distance to the position R4 of FIGURE 8K, and is then return back to the position of FIGURE 8G, the rinsing being thus completed. Any saline in the forward end of tube 26 is then sucked back to vacuum. The calcium chloride solution of tube 27 and the thromboplastin solution of tube 25 are lost in this rinsing operation, but since these are inexpensive the loss is not material.

By the pressing of rinse button 218, contact S1B was also opened, thus extinguishing the rinse signal lamp 216, the circuit which had previously been established by the energization of relay K2, and closure of its contacts K2C, which occurred, at the time the leading edge of cam 129, timer 115, reached contact F, whereupon a 50 volt supply through junction 194, line 195, contact K2C and line 197, resistor 198 to junction 199 was then applied to the circuit 222. The closure of the contact K2C provided a momentary voltage pulse through condenser 222A and resistor 222B, junction 222C, and resistor 222D to junction 226. This provides a current pulse via the line 223 to the silicon controlled rectifier at 221, which then started to conduct, and remained in a conductive condition, accordingly illuminating the lamp 216 until the circuit was subsequently interrupted at push button switch 220 as described.

The operation of the circuit of print lamp 191, which was also initiated through the similar circuit at 200–204, placed a current pulse on the silicon controlled rectifier 212, in the network 208, and the print lamp 191 therefore also became illuminated at the time of closure of contact K2C.

The energization of the rinse lamp 216 by the closure of relay K2, is the signal to the operator that the rinsing operation may thereafter be performed. One or several rinsing operations may be performed as desired. The first of such rinsing operations will have the effect of extinguishing the rinse lamp signal 216.

The test sample in the cup 64E, which has meanwhile been undergoing testing by the projection of the light beam 147–147A therethrough supplies the light signal via line 149 to the signal input differentiator and amplifier 152 in the signal slope detector and signal pass and sensor 154. These provide an output at terminal 157 which communicates through the resistor 158 and junction 159, condenser 160 to ground. The signal at 159 is applied through resistor 161 and is amplified by the transistor 162, and via line 168 is further amplified at the transistor 169, and the output on line 172 is applied to the coil of relay K3 which is bridged by the diode 176. The diode 176 is a protective device to receive the inductive back voltage occurring upon deenergization of the coil of relay K3, and prevents a back voltage surge against the transistors 169. At the end of the "prothrombin time" period, when the slope of the curve of light signal on the input line 149 has reached a minimum in the negative sense, the resultant signal operates relay K3, which thereupon opens contacts K3A and breaks the self-sustaining circuit for relay K2 which thereby also moves to the de-energized condition. The opening of contacts K2B interrupts the supply from X1, through contact K2B and lead 4 of connector 180 to coil 186A of the timer clutch, and this stops the time signal at the digital indicator 185. The printing mechanism, not illustrated, which has been similarly moved to the time as determined, is then to be printed out. This is accomplished by pressing the print button 178, which establishes the circuit from X1 through lead 2 of plug 180, junction 188, push button 178, to contact 181, thence through the print motor 182, junction 184 and lead 3 of plug 180 to X1. The print motor then starts and through its own cam 183—183 closes its switch S4A against the contact 185, thus insuring a full revolution of the switch, and also opens its switch S4B, thereby extinguishing the circuit which had previously been established through the print lamps 191. The print motor continues through one full revolution, thereby accomplishing the printing out of the time reading on a suitable tape or card, not illustrated, and simultaneously resets the digital indicator 185 to the zero position.

If because of any failure of the sample, or any other cause, it is desired to reset the entire mechanism to a starting position the operator can accomplish this by merely pushing the print button 178, and this then breaks the circuit for relay K2, which had been maintained through this push button contact.

It may be noted that in the rinse lamp circuit, the rinse lamp is initially brought to an activated condition by a voltage pulse transmitted via condenser 222A, after which the silicon controlled rectifier circuit 221 maintains the rinse lamp signal in an energized signal, and this can only be extinguished by pressing the rinse push button 218. This eliminates the possibility of taking a second sample without previously having accomplished the rinsing function.

As many widely apparently different embodiments of this invention may be made without departing from the spirit and scope thereof, it is to be understood that we do not limit ourselves to the specific embodiments disclosed herein.

What we claim is:

1. The method of making a prothrombin time measurement of blood plasma comprising the steps of drawing test quantities of plasma and test reagent fluids each into a separate elongated resilient walled pipet having an inlet end and a resilient branch outlet by squeezing the pipet branch to close it, then squeezing all of said pipets to close the inlet ends thereof, squeezing said pipets to initiate induction of pressure therein, separately discharging the plasma and reagents from the pipets by discontinuing pressure on the branches thereof while continuing application of pressure on the pipets to force therefrom the fluids contained therein, the fluids being directed into a common receptacle.

2. The method of claim 1 further characterized in that when the plasma fluid has been discharged from its pipet, said pipet is flushed by drawing a cleaning fluid therethrough while the outlet branch thereof is closed by squeezing.

3. The method of claim 2 further characterized in that the cleaning liquid is discharged from said pipet through the outlet branch thereof by squeezing its inlet end to close it and discontinuing squeezing of the outlet branch so that it is open, and squeezing said pipet to induce pressure therein to discharge said cleaning fluid.

4. The method of claim 2 further characterized in that the cleaning fluid is caught at a point above the test receptacle and is separately discharged.

5. In a machine for making prothrombin time test measurements of blood plasma the improvements comprising a pipet for measuring and dispensing said plasma, said pipet comprising a tube of resilient material, having a first end of which is the inlet and a second end adapted to be connected to a source of suction and a side branch of resilient tubing connected in fluid tight relation to the pipet tube near said inlet end and forming a delivery outlet from the pipet tube, a first occluder mounted to squeeze close the pipet tube between the inlet and side branch and a second occluder mounted to squeeze close the side branch, squeezing means for applying pressure on the pipet tube to induce pressure therein for forcing fluid therefrom, and a test receptacle located below the side branch to receive the fluid discharged therefrom.

6. The improvements of claim 5 further characterized in that control means is provided for operating the second occluder to close the side branch while a plasma sample is drawn into the pipet tube by vacuum applied thereto and for then operating the first occluder to close the pipet tube inlet as the squeezing means is operated to apply pressure to the pipet tube and the second occluder is opened to permit discharge of the fluid in the pipet tube through said side branch and into the test receptacle.

7. The improvements of claim 5 further characterized in that a cover for the test receptacle is mounted on the machine for movement from a position remote from the receptacle to a position beneath the outlet of the side branch but over the test receptacle.

8. The improvements of claim 7 further characterized in that the cover is in the form of a pan having a drain therefrom for receiving fluid from the side branch outlet while in covering position over the test receptacle.

9. The improvements of claim 5 further characterized in that the squeezing means comprises a plate upon which the pipet tube rests and a roller movable from a position out-of-contact with the tube and near said second end thereof thence in tube-squeezing relation along the tube to a position near said side branch, and thence back to said out-of-contact position.

10. The improvements of claim 5 further characterized in that the pipet tube has a first metal tube segment forming the first end and another metal tube segment adjacent the second end, said metal tube segments being out of the operational path of said squeezing means, and electrical connections to said metal segments.

11. The improvements of claim 10 further characterized in that power means is provided for operating said first occluder when said power means is energized, said power means being connected to said electrical connections so as to be energized when a circuit is established between them through the plasma in the pipet tube.

12. The improvements of claim 5 further characterized in that said side branch has an outlet nozzle tube sharpened to a beveled face.

13. The improvements of claim 5 further characterized in that each of said occluders comprises a plate against which the tube to be occluded is adapted to rest and a bar movable to and from tube-squeezing position.

14. The improvements of claim 5 further characterized in that the first occluder is spring biased to a normal, non-occluding condition and the second occluder is spring biased to a normal occluding condition, and each occluder has power means connected thereto, which when energized moves its occluder from its normal condition.

15. The improvements of claim 5 further characterized in that for each additional reagent used in admixture with the blood plasma there is provided a reservoir for containing said reagent and a pipet tube for measuring and dispensing said reagent, said reagent pipet tube being like that used for measuring the plasma but having its first end connected to said reagent reservoir and its second end closed by a valved connector adapted to be connected to suction, said first and second occluders and said squeezing means being adapted to operate simultaneously upon said plasma and reagent pipet tubes, the outlets of the side branches of all said pipet tubes being directed for delivery simultaneously into said test receptacle.

16. The improvements of claim 15 further characterized in that the receptacle of each reagent is transparent and is supported in a position to be viewed by the operator.

17. The improvements of claim 15 further characterized in that the receptacle of each reagent is supported on the exterior of the machine so as to be at substantially room temperature.

18. The improvements of claim 15 further characterized in that all said pipet tubes are supported generally parallel on a common platform with the side branches thereof extending downward through the platform.

19. The improvements of claim 15 further characterized in that the side delivery tubes extend downward from said platform proximate a support surface and the first occluder includes a member for pressing the tubes against the platform to close them and the second occluder includes a member for pressing the side branches against said support surface to close them.

20. A machine for making prothrombin time test measurements comprising separate delivery channels for plasma and testing reagents, motor means for delivering test quantities of plasma and testing reagents through said channels directly into a test receptacle, operator actuated means for cyclically operating the motor means, means for projecting a light beam through said receptacle for determining the clotting time of the plasma by reference to the amount of light transmitted through the test mixture, a signal system responsive to the transmitted light for indicating the occurrence of clotting, time indicator means, delivery actuatable means operated as a result of delivery of said plasma and reagents to the test receptacle for initiating operation of said time indicator means, and means for control responsive to said signal system and connected to said time indicator means for deactuating it for ending the operation of the time indicator means when the light beam is effected by clotting of the plasma.

21. The machine of claim 20 further characterized in that a sequence timer is provided which is capable of one full cycle of operation once operation is initiated, and said delivery means is connected thereto for initiating operation of the sequence timer when delivery of plasma to its delivery channel has been accomplished, and said sequence timer is connected to the time indicator means for initiating operation of the time indicator means as a function of the operation of the sequence timer.

22. The machine of claim 21 further characterized in that said sequence timer is adjustable for arbitrarily varying the time for initiating operation of said time indicator means.

23. The machine of claim 21 further characterized in that means is provided responsive when operation of said sequence timer has been initiated for de-activating said signal system for a re-stabilizing time period less than the shortest prothrombin time period which is to be measured.

24. The machine of claim 21 further characterized in that means is provided responsive to the sequence timer for de-activating said signal system.

25. The machine of claim 21 further characterized in that a plurality of test receptacles are supported on a common frame and propulsion means is provided for advancing them sequentially to a testing station.

26. The machine of claim 25 further characterized in that said propulsion means is connected to the sequence timer so as to be actuated thereby initially, preparatory to delivery of plasma and testing reagents thereinto.

27. The machine of claim 25 further characterized in that a manual control is provided for actuating the propulsion means.

28. The machine of claim 21 further characterized in that signal means is connected to said sequence timer so as to be actuated thereby to indicate that rinsing of the machine is required and means is provided for rinsing the plasma delivery channel and means is provided operable coincidental with operation of the means for rinsing for de-activating said signal.

29. A machine for making prothrombin time test measurements comprising cyclically operable means for delivering test quantities of plasma and testing reagents into a test receptacle, operator actuated means for cyclically operating the aforementioned means, means for projecting a light beam through this receptacle for determining the clotting time of the plasma by reference to the amount of light transmitted through the test mixture, a signal system responsive to the transmitted light for indicating the occurrence of clotting, a sequence timer capable of operating through a full cycle of operations when its operation has once been initiated, time indicator means, delivery actuatable means operated as a result of delivery of said plasma and reagents to the test receptacle for initiating operation of said sequence timer, control means operated by said sequence timer for arbitrarily initiating operation of said time indicator means, and means for control responsive to said signal system and connected to said control means for deactuating it for ending the operation of the sequence timer when the light beam is effected by clotting of the plasma, said machine being further characterized in that signal means connected to said control means so as to be actuated thereby is provided to indicate that rinsing of the machine is required and means is provided operable coincidental with operation of the machine for rinsing for de-activating said signal.

References Cited

UNITED STATES PATENTS

| | | | |
|---|---|---|---|
| 3,267,364 | 8/1966 | Page et al. | 73—53 X |
| 3,302,452 | 2/1967 | Leslie | 73—64.1 |
| 3,307,392 | 3/1967 | Owen et al. | 73—64.1 |

LOUIS R. PRINCE, *Primary Examiner.*

J. W. ROSKOS, *Assistant Examiner.*

U.S. Cl. X.R.

23—258.5; 88—14